United States Patent
Banevicius et al.

(10) Patent No.: US 10,336,857 B2
(45) Date of Patent: Jul. 2, 2019

(54) PROCESS FOR THE PREPARATION OF SILYLATED POLYMERS EMPLOYING A BACKMIXING STEP

(71) Applicant: Momentive Performance Materials Inc., Waterford, NY (US)

(72) Inventors: John Banevicius, Clifton Park, NY (US); Misty Huang, New City, NY (US); Brendan O'Keefe, Parkersburg, WV (US); Vikram Kumar, Tarrytown, NY (US); Bruce Barbera, Sleepy Hollow, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 15/794,515

(22) Filed: Oct. 26, 2017

(65) Prior Publication Data

US 2018/0044466 A1 Feb. 15, 2018

Related U.S. Application Data

(62) Division of application No. 14/823,588, filed on Aug. 11, 2015, now Pat. No. 9,828,459.

(51) Int. Cl.
| | |
|---|---|
| *C08G 18/83* | (2006.01) |
| *C08G 18/10* | (2006.01) |
| *C08G 18/08* | (2006.01) |
| *B01J 19/24* | (2006.01) |
| *C08G 18/48* | (2006.01) |
| *C08K 5/524* | (2006.01) |
| *C08K 5/134* | (2006.01) |

(52) U.S. Cl.
CPC ........ *C08G 18/837* (2013.01); *B01J 19/2415* (2013.01); *C08G 18/08* (2013.01); *C08G 18/10* (2013.01); *C08G 18/48* (2013.01); *B01J 2219/00103* (2013.01); *B01J 2219/24* (2013.01); *C08K 5/1345* (2013.01); *C08K 5/524* (2013.01)

(58) Field of Classification Search
None
See application file for complete search history.

(56) References Cited

U.S. PATENT DOCUMENTS

| | | | |
|---|---|---|---|
| 3,829,505 A | 8/1974 | Herold | |
| 3,905,929 A | 9/1975 | Noll | |
| 3,941,849 A | 3/1976 | Herold | |
| 4,242,490 A | 12/1980 | Emerson et al. | |
| 4,335,188 A | 6/1982 | Keishiro et al. | |
| 4,687,851 A | 8/1987 | Laughner | |
| 4,985,491 A | 1/1991 | Reisch | |
| 5,096,993 A | 3/1992 | Smith | |
| 5,100,997 A | 3/1992 | Reisch et al. | |
| 5,106,874 A | 4/1992 | Porter et al. | |
| 5,116,931 A | 5/1992 | Reisch et al. | |
| 5,136,010 A | 8/1992 | Reisch et al. | |
| 5,185,420 A | 2/1993 | Smith et al. | |
| 5,266,681 A | 11/1993 | Reisch et al. | |
| 5,688,863 A * | 11/1997 | Kirchmeyer | C08G 18/10 524/323 |
| 5,990,257 A | 11/1999 | Johnston et al. | |
| 7,435,787 B2 | 10/2008 | Banevicius et al. | |
| 7,732,554 B2 * | 6/2010 | O'Keefe | C08G 18/089 528/28 |
| 8,101,704 B2 | 1/2012 | Baumann et al. | |
| 2007/0060735 A1 | 3/2007 | Banevicius et al. | |
| 2007/0100108 A1 | 5/2007 | Huang et al. | |
| 2008/0064842 A1* | 3/2008 | Jacobine | C08G 18/10 528/28 |
| 2009/0030145 A1* | 1/2009 | Johnston | C08G 18/4837 524/590 |
| 2009/0048407 A1 | 2/2009 | Barbieri et al. | |
| 2009/0311459 A1* | 12/2009 | Griswold | C08G 18/10 428/41.8 |
| 2010/0016537 A1 | 1/2010 | Bamann et al. | |
| 2011/0293891 A1* | 12/2011 | Leyden | G03F 7/0037 428/172 |
| 2012/0004374 A1 | 1/2012 | Stanjek et al. | |
| 2012/0116030 A1 | 5/2012 | Hepperle et al. | |

FOREIGN PATENT DOCUMENTS

| | | |
|---|---|---|
| DE | 10 2009 001489 | 9/2010 |
| DE | 10 2011 085944 | 5/2012 |
| EP | 0 598 283 | 5/1994 |

OTHER PUBLICATIONS

Dow Answer Center, Dec. 2014 (Year: 2014).*
Tinuvin 765 Data sheet, Feb. 2018 (Year: 2018).*
Cray Valley Hydroxyl Terminated Polybutdiene resins and Derivatives—Poly bd and Krasol), Feb. 2010, downloaded Dec. 6, 2018. (Year: 2018).*
U.S. Appl. No. 14/823,580, filed Aug. 11, 2015 (claims attached).
International Search Report and Written Opinion from PCT/US2016/044240 dated Oct. 14, 2016.
Kraume, "Continuous Mixing of Fluids", Ullmann's Encyclopedia of Industrial Chemistry. vol. 10. Dec. 2012.

* cited by examiner

*Primary Examiner* — Christopher M Rodd
(74) *Attorney, Agent, or Firm* — James C. Abruzzo

(57) ABSTRACT

A continuous process for preparing a silylated polymer comprising a silylation step where a prepolymer having reactive functional groups, a first intermediate product, is reacted continuously with a silylating agent in an endcapping tubular reaction unit to form a second intermediate product, and where at least a portion of the second intermediate product is backmixed continuously with the first intermediate product to form the silylated polymer. The continuous process may further comprise a stabilization step, a quenching step or both a stabilization step and a quenching step.

20 Claims, 7 Drawing Sheets

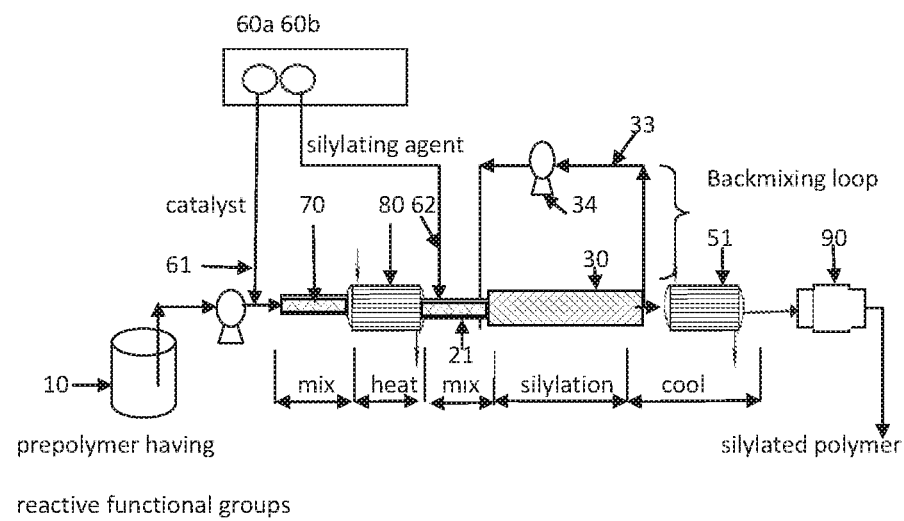
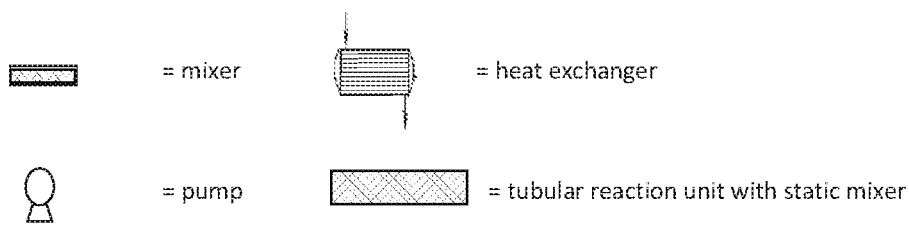
Figure 1. Continuous Silylation Process with Backmixing

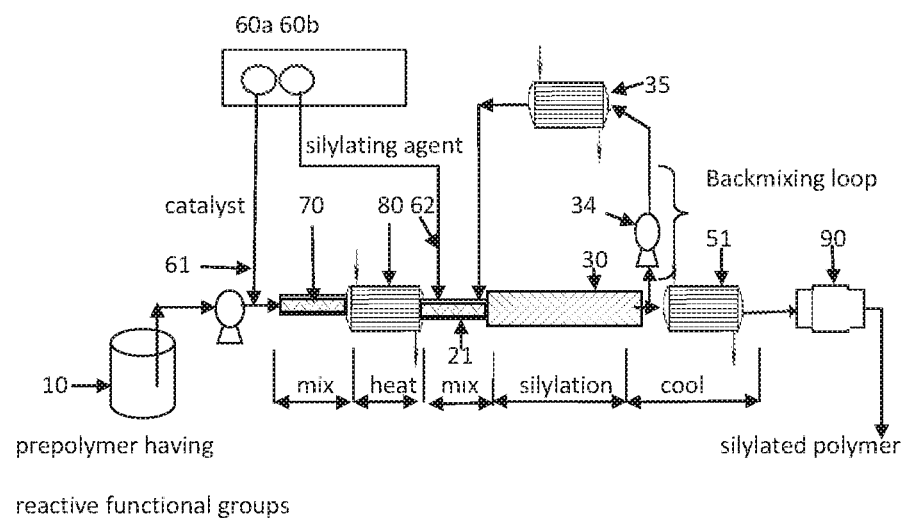
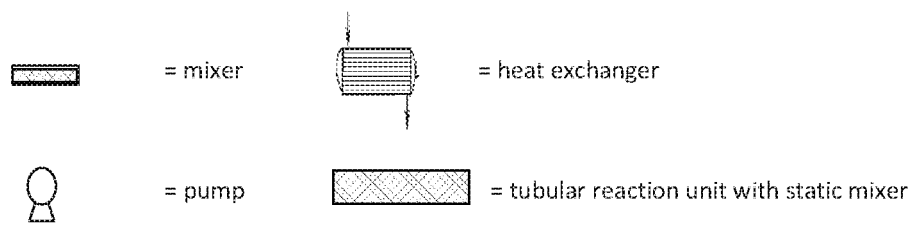
Figure 2. Continuous Silylation Process with Pump and Heat Exchanger in the Backmixing Loop

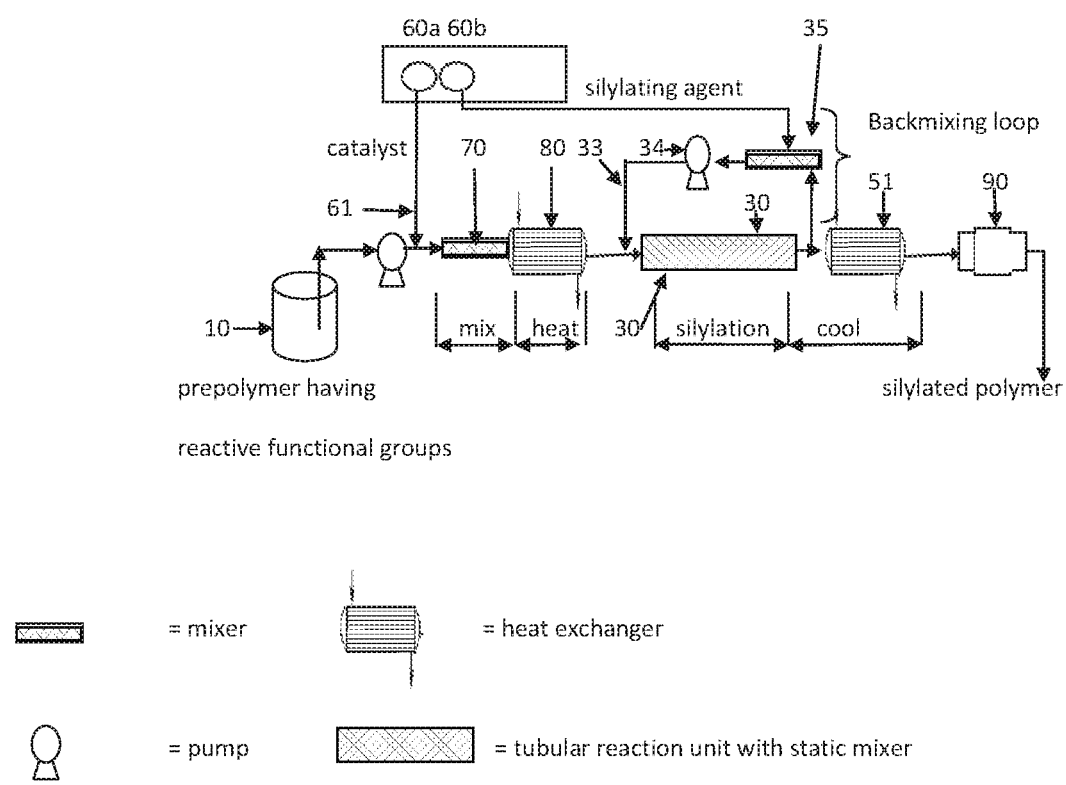
Figure 3. Continuous Silylation Process with Pump and Mixer in Backmixing Loop.

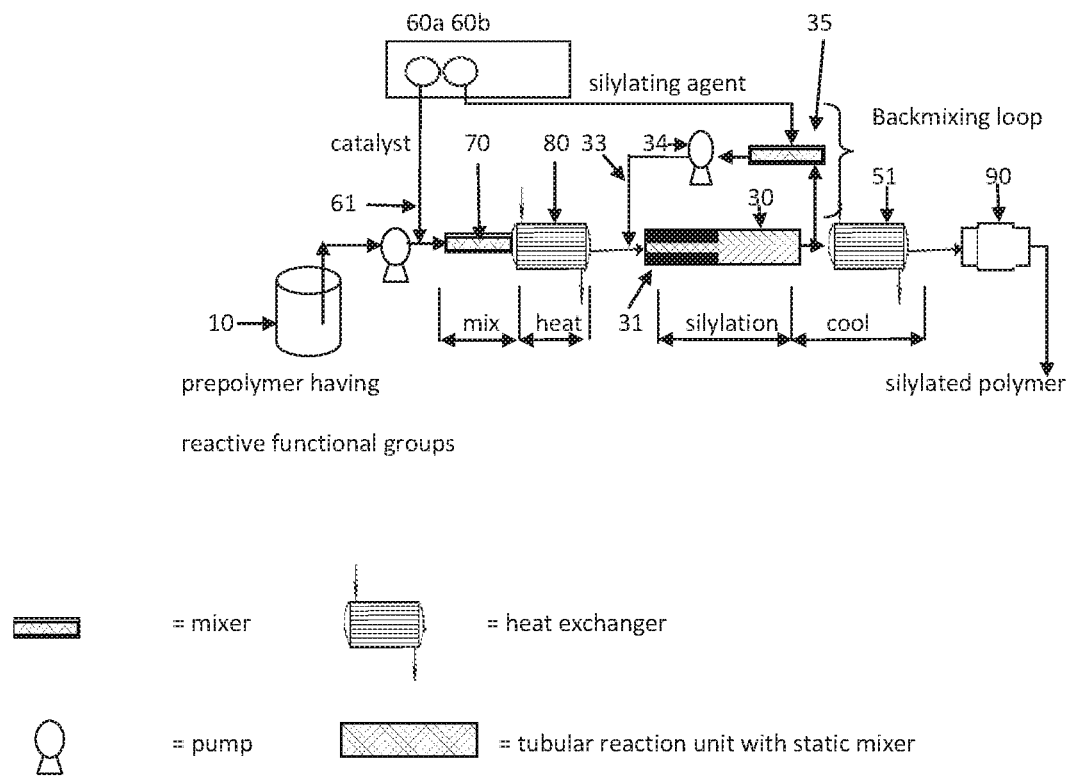
Figure 4. Continuous Silylation Process with Backmixing and Variable Diameter Silylation Unit

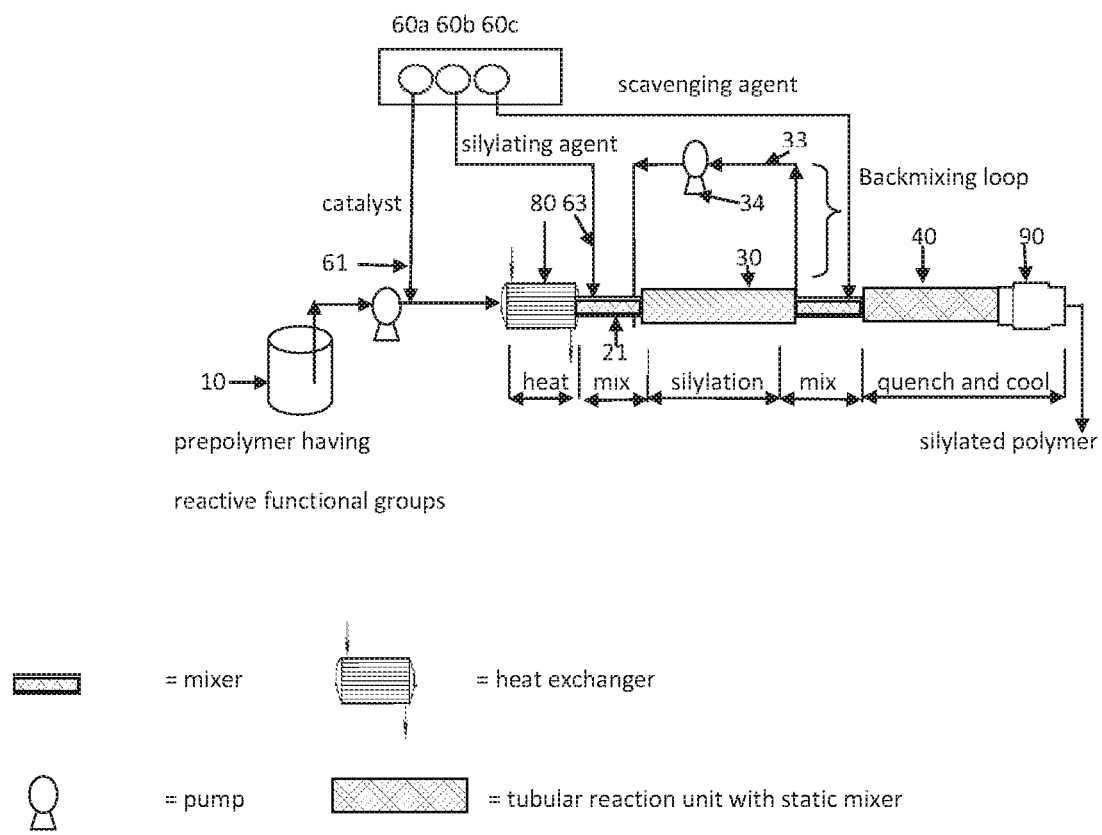
Figure 5. Continuous Silylation Process with Backmixing and Quenching Step

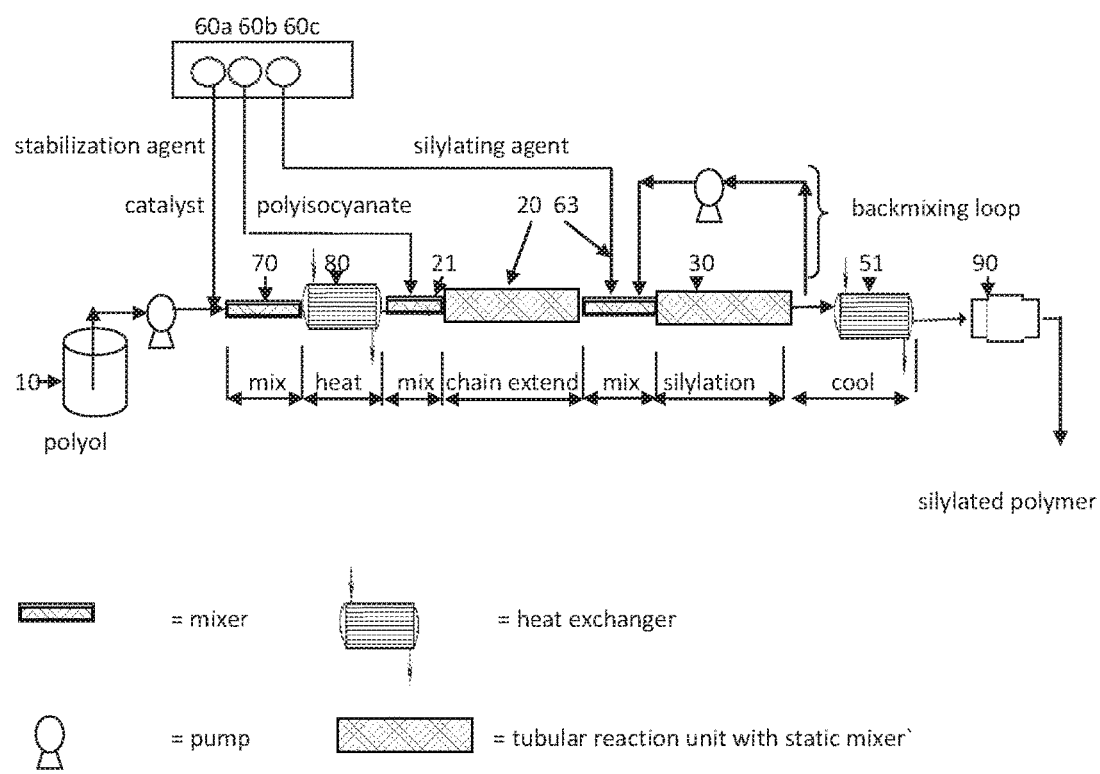
Figure 6. Continuous Silylation Process with Backmixing, Stabilization and Chain Extension Step

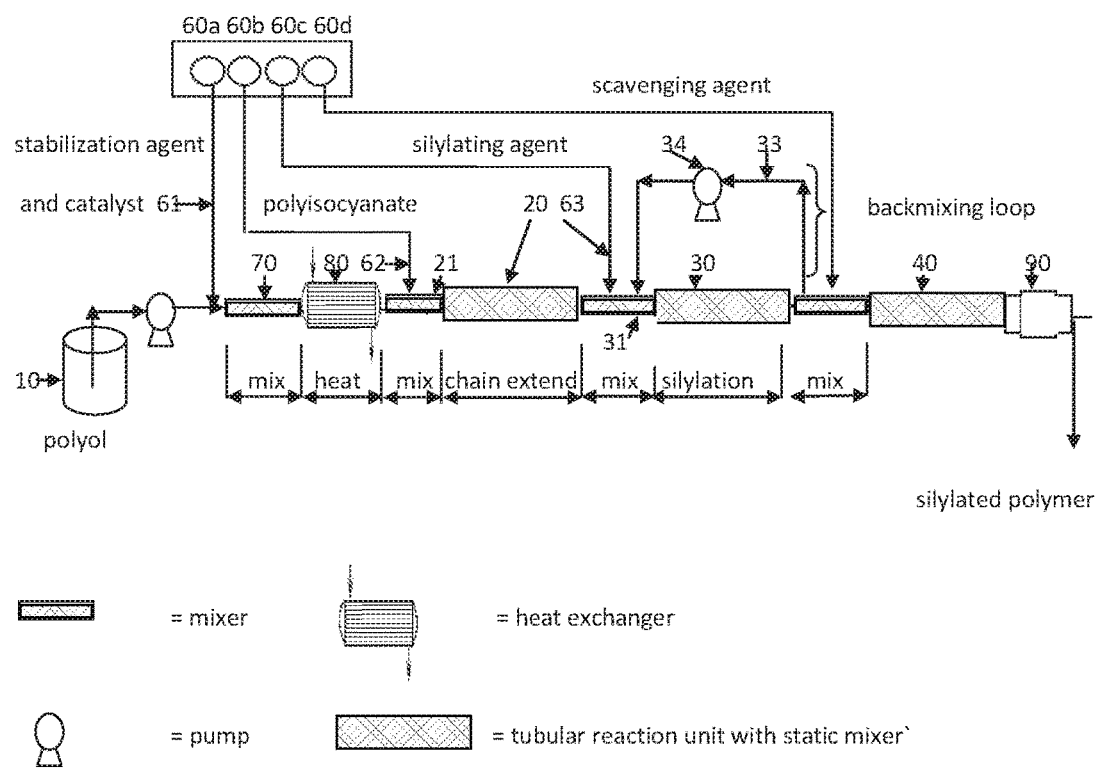
Figure 7. Continuous Silylation Process with Backmixing, Stabilization, Chain Extension and Quenching Steps

PROCESS FOR THE PREPARATION OF SILYLATED POLYMERS EMPLOYING A BACKMIXING STEP

CROSS-REFERENCE TO RELATED APPLICATIONS

The present application is a divisional application of U.S. patent application Ser. No. 14/823,588 filed Aug. 11, 2015, the entire contents of which is incorporated by reference herein.

FIELD OF INVENTION

Disclosed herein are a process and a system for preparing silylated polymers. The process, being a continuous process, comprises a silylating step with backmixing where a prepolymer is reacted with a silylating agent to produce a silylated polymer composition. Backmixing delivers at least a portion of the silylated polymer composition upstream to adjust an upstream process parameter. In another aspect, the process also includes stabilizing the prepolymer and/or quenching the silylated polyurethane composition.

BACKGROUND OF THE INVENTION

In the field of polymer production, silylated polymers are generally known to be useful as components of coatings, adhesives, sealants and other elastomeric products. The production of silylated polymers has traditionally employed a process whereby a prepolymer having reactive functional groups is reacted with a silylating agent, having groups reactive with the prepolymer, to produce a silylated polymer.

Commercially useful silylated polymers include moisture-curable polymers such as for example moisture-curable silylated polyurethane polymers. A process for preparing the silylated polyurethanes involves reacting a polyurethane prepolymer, as a first intermediate product, having terminal reactive groups with a silylating agent, such as for example an isocyanato-functional alkylalkoxysilane, to produce a silylated polyurethane composition, as a second intermediate product, having silylated polyurethanes that are endcapped with alkoxysilyl groups. Huang, et al. discloses one such process in US Patent Application Publication No. US2007/0100108.

These processes, and the silylated polymers produced from them, have several characteristics which render them problematic and which in part drive the need to develop better processes for producing silylated polymers. For example, the viscosity of the produced silylated polymer composition tends to erode over time such that the viscosity observed immediately after production of the silylated polymer does not remain the same, but rather increases over time. This phenomenon is due in part to the inability of the conventional process to bring the silylating reaction to completion. That is, when the prepolymer with reactive functional groups are reacted with the silylating agent in a continuous process, for example, this reaction is too slow. This results in a silylated polymer composition where some of the reactive functional groups on the prepolymer and some of the reactive groups on the silylating agent remain unreacted in the composition. Over time, these unreacted reactive functional groups will continue to react in the composition, resulting in viscosity creep. As used herein, the term "viscosity creep" refers to changes in the viscosity of a composition, such as the silylated polymer composition, over time as the composition ages. This generally refers to an increase in viscosity as the composition ages.

Another drawback of these processes is that the components in the produced silylated polymer composition that have unreacted reactive functional groups will function similarly to plasticizers. In this regard, they produce deteriorations in the mechanical properties of the silylated polymer composition, that would otherwise not be present or be present to a lesser degree. For example, the components with unreacted reactive functional groups cause a comparative reduction in tensile strength, shore hardness and modulus.

The unreacted reactive functional groups also contribute to variability in the produced silylated polymer compositions. This variability adds unwanted processing costs and losses for the manufacturer and for the consumer. It also results in unfavorable customer opinions as customers are likely to feel less confident that the produced moisture-curable silylated polymer meets their desired specifications.

Still another drawback of these processes is that the long production times, catalysts and high temperatures used to produce the silylated polymers lead to color formation.

One approach to force the reaction to completion is to use a large excess of the silylating agent in the conventional process relative to the prepolymer having reactive functional groups. The drawback is that the process is inefficient, requiring the use of large excesses of expensive silylating agents that remain unreacted in the silylated polymer composition, and therefore do not contribute to the silylation reaction. The unreacted silylating agent affects the viscosity and mechanical properties of the moisture-curable silylated polymer composition.

There remains a need for processes that can produce silylated polymers with reduced process and product variability, does not require large excesses of silylating agent to complete the silylation reaction and has low color.

SUMMARY OF THE INVENTION

Disclosed herein is a continuous process for the preparation of a silylated polymer. The inventors have surprisingly found that the continuous process addresses at least one of the drawbacks discussed above.

In a first aspect of the continuous process the process includes a silylation step with backmixing. The process for the preparation of a silylated polymer comprises continuously reacting a prepolymer with a silylating agent, by a silylation reaction, to produce a silylated polymer composition; and continuously backmixing, by a backmixing means, at least a first portion of the silylated polymer composition to adjust at least one upstream process parameter. The silylating step with backmixing comprises reacting continuously, by an endcapping reaction in a tubular reaction unit, a prepolymer having reactive functional groups, as a first intermediate product, with a silylating agent to produce a silylated polymer composition, as a second intermediate product, and backmixing continuously at least a portion of the second intermediate product into the endcapping reaction in the tubular reaction unit.

A second aspect of the process, the continuous process includes a silylation step with backmixing and at least one of a stabilization step or a quenching step.

In another embodiment the continuous process comprises a silylating step with backmixing and further comprises a stabilization step. The stabilization step comprises continuously mixing a prepolymer having reactive functional groups with a stabilization package to form a stabilized prepolymer. The silylating step with backmixing comprises reacting continuously, by an endcapping reaction in a tubular reaction unit the stabilized prepolymer having reactive functional groups, as a first intermediate product, with a silylating agent to produce a silylated polymer composition, as a second intermediate product, and backmixing continuously at least a portion of the second intermediate product into the endcapping reaction in the tubular reaction unit.

In still another exemplary embodiment, the continuous process comprises a silylating step with backmixing and further comprises a quenching step. The silylating step with backmixing comprises reacting continuously, by an endcapping reaction in a tubular reaction unit a prepolymer having reactive functional groups, as a first intermediate product, with a silylating agent to produce a silylated polymer composition, as a second intermediate product, and backmixing continuously at least a portion of the second intermediate product into the endcapping reaction in the tubular reaction unit. In the quenching step, at least a portion of the silylated polymer composition is continuously directed downstream to the quenching unit. The quenching step comprises mixing continuously the second intermediate product with a scavenging package to produce a quenched silylated polymer composition.

In yet still another exemplary embodiment, the continuous process comprises a silylating step with backmixing and further comprises a stabilization step and a quenching step. The stabilization step comprises mixing continuously a prepolymer having reactive functional groups with a stabilization package to form a stabilized prepolymer. The silylating step with backmixing comprises reacting continuously, by an endcapping reaction in a tubular reaction unit the stabilized prepolymer having reactive functional groups, as a first intermediate product, with a silylating agent to produce a silylated polymer composition, as a second intermediate product, and backmixing continuously at least a portion of the second intermediate product into the endcapping reaction in the tubular reaction unit. In the quenching step, at least a portion of the silylated polymer composition is continuously directed downstream to the quenching unit. The quenching step comprises mixing continuously the second intermediate product with a scavenging package to produce a quenched silylated polymer composition.

The continuous process, including the silylation step with backmixing, the stabilization step or the quenching step and other optional steps are described herein in further detail.

BRIEF DESCRIPTION OF THE DRAWINGS

FIG. 1 is a diagram of an embodiment of the continuous process for producing a silylated polymer with a silylating step and a backmixing loop, which removes the second intermediate product from the outlet of the endcapping tubular reaction unit and transports the second intermediate product to a mixer containing the silylating agent and the prepolymer containing reactive functional groups which mixes and transports the mixture to inlet of the endcapping tubular reaction unit and an upstream temperature controlling step using a heat exchanger unit.

FIG. 2 is a diagram of an embodiment of the continuous process for producing a silylated polymer with a silylating step and a backmixing loop, where the backmixing loop removes the second intermediate product from the outlet of the endcapping tubular reaction unit and transports the second intermediate product to a mixer containing the silylating agent which mixes and transports the mixture to inlet of the endcapping tubular reaction unit and where the backmixing loop has a heat exchanger to control the temperature of the second intermediate product.

FIG. 3 is a diagram of an embodiment of the continuous process for producing a silylated polymer with a silylating step with backmixing, where the backmixing loop removes the second intermediate product from the outlet of the endcapping tubular reaction unit and transports the second intermediate product to a mixer which is part of the backmixing loop, contains the silylating agent, mixes and transports the mixture to the endcapping tubular reaction unit and an upstream heating step and downstream cooling step using heat exchangers.

FIG. 4 is a diagram of an embodiment of the continuous process for producing a silylated polymer with a silylating step with backmixing, where the backmixing loop removes the second intermediate product from the outlet of the endcapping tubular reaction unit and transports the second intermediate product to a mixer which is part of the backmixing loop, contains the silylating agent, mixes and transports the mixture to the endcapping tubular reaction unit and an upstream heating step and downstream cooling step using heat exchanger and where the endcapping tubular reaction unit has a variable diameter reaction chamber.

FIG. 5 is a diagram of an embodiment of the continuous process for producing a silylated polymer with a silylating step with backmixing loop which removes the second intermediate product from the outlet of the endcapping tubular reaction unit and transports the second intermediate product to a line containing the silylating agent and the first intermediate product and transports the mixture to inlet of the endcapping tubular reaction unit, an upstream temperature controlling step using a heat exchanger unit and a downstream quenching step.

FIG. 6 is a diagram of an embodiment of the continuous process for producing a silylated polymer with a silylating step with backmixing loop having a pump, an upstream stabilization step, upstream heat exchanger, upstream chain extension unit, and downstream cooling unit.

FIG. 7 is a diagram of an embodiment of the continuous process for producing a silylated polymer with a silylating step with backmixing loop having a pump, an upstream stabilization step, upstream heat exchanger, upstream chain extension unit and downstream quenching and cooling unit.

DETAILED DESCRIPTION

Through this disclosure and description of certain preferred embodiments of the claimed invention, a written description, enablement, best mode and inventive steps are herein provided. While Applicant, through these descriptions, seeks to disclose the invention through descriptions of particular exemplary embodiments such that those of ordinary skill in the art may understand and practice Applicant's claimed invention, these embodiments are not exhaustive and are intended merely to provide illustrations of some of the presently preferred embodiments of the invention. The metes and bounds of the invention are defined by claims and their equivalents and are supported by the descriptions and disclosures presented in these exemplary embodiments. In general, the terms and phrases used herein have their art-recognized meaning, which can be found by reference to standard texts, journal references and contexts known to those of ordinary skill in the art, unless otherwise defined herein.

As noted above, in a first aspect, the continuous process of producing a silylated polymer comprises a silylating step with backmixing. The silylating step with backmixing comprises an endcapping reaction where a prepolymer having reactive functional groups, as a first intermediate product, is reacted with a silylating agent to produce a silylated polymer composition, as a second intermediate product. As used herein, the term second intermediate product is interchangeable with the silylated polymer composition product produced from the silylation reaction. In this respect, the second intermediate product contains fully silylated polymers and partially silylated polymers. In the fully silylated polymers the terminal reactive functional groups are silylated whereas in a partially silylated polymer at least one of the terminal reactive functional groups is not silylated. The process also includes a step of backmixing continuously at least a portion of the second intermediate product into the endcapping reaction in a tubular reaction unit. The reaction of the reactants is done in a process chamber suitable for continuously receiving the reactants and continuously expressing the reaction product from the process chamber. Backmixing of the second intermediate product comprises removing at least a portion of the second intermediate product from a downstream location in the continuous process and continuously delivering that portion to an upstream location of the continuous process. For example, at least a portion of the second intermediate product can be removed from an outlet of the process chamber and delivered by a backmixing means upstream to an inlet of a process chamber.

Applicants have surprisingly found that by backmixing at least a portion of the second intermediate product, the finally produced silylated polymer can be repeatedly produced with less variability in its mechanical properties. Moreover, it has been found that this avoids the use of excess amounts of expensive silylating agents. Backmixing also allows the silylating reaction of the silylating step to proceed to completion or closer to completion, relative to processes without backmixing. This allows the use of less scavenging agents and also prevents or decreases the instances of viscosity creep and degeneration of the mechanical properties of the finally produced silylated polymer. By using a backmixing step, reaction and process parameters in one process unit may be adjusted without affecting the continuous processing steps upstream or downstream of the silylating step. For example, residence time, temperature, or ratio of the weight of a first portion of the silylated polymer composition to the weight of the prepolymer being fed into the silylation unit can be adjusted.

While not wishing to be bound by any specific theory, it is believed that the variability in mechanical properties and the viscosity creep are due in part to the presence of unreacted reactive groups in the second intermediate product. For example, the endcapping reaction produces a silylated polymer composition containing silylated polymers and partially silylated polymers. By "partially silylated," it is meant that the polymer composition contains polymers where some of the reactive functional groups of the prepolymers remain unreacted with the silylating agent. In other instances, the unreacted reactive groups are attributed to the silylating agent, or to other reaction components added to the process that remain unreacted in the silylated polymer composition. Applicant has found that by backmixing at least a portion of the second intermediate product, this allows for the independent adjustment of reaction properties in the targeted process chamber without affecting other reactions in the continuous process, particularly the flow rate, temperature and reaction rate of the reactants This is particularly advantageous in continuous processes since the adjustment of reaction properties can be managed in each reaction chamber independently without affecting other reaction chambers. For example, in a continuous process, the reaction properties of the endcapping reaction can be adjusted by backmixing at least a portion of the second intermediate from an outlet of the endcapping tubular reaction unit to an inlet of the endcapping unit without affecting the reactions occurring in upstream or downstream reaction units.

As noted above, in a second aspect of the process, the continuous process includes a silylation step with backmixing and at least one of a stabilization step or a quenching step. Applicant has found that by stabilizing the prepolymer before the endcapping reaction, this reduces the discoloration of the finally produced silylated polymer. Particularly, it has also been found that stabilizing the prepolymer before the endcapping reaction reduces the discoloration change over time. The stabilization packages described herein are particularly effective in reducing the discoloration.

Applicant has also found it advantageous to quench the silylated polymer composition produced from the silylating step with backmixing. In one embodiment, at least a second portion of the silylated polymer composition is continuously reacted with the scavenging agent or scavenging package to reduce an amount of unreacted reactive functional groups that remain in the silylated polymer composition. This produces a quenched silylated polymer composition.

Applicant has also found it particularly advantageous where the continuous process includes a silylating step, a stabilization step and a quenching step; where all the above advantages are combined to provide a more efficient process. While the particular advantages described above are attributed to the respective steps, it is also contemplated that other advantages, such as improved efficiency of the process, may be gained by adding further reactants or further reaction steps to the continuous process. For example, various optional upstream and downstream process chambers and feed lines are contemplated. Process chambers as described herein include reaction units, pumps, reservoirs, heat exchangers, mixers, analysis chambers and storage chambers. Reaction units suitable for the process will be apparent to those of skill in the art. However, reaction units such as the silylation unit used for the endcapping reaction between the first intermediate product and the silylating agent, or that used for the stabilization step or the quenching step, are preferably tubular reaction units. These tubular reaction units have a tubular reaction chamber with an upstream inlet for continuously receiving reactants and a downstream outlet for continuously expressing reaction product. It is within the scope of this disclosure that other various reactants will be added to the continuous process or that other reaction chambers will be included upstream or downstream of the endcapping unit in a continuous process.

In one embodiment of the process, the silylating step with backmixing comprises feeding a first intermediate product that is mixed continuously with a silylating agent in a reaction chamber referred to interchangeably herein as the endcapping unit or the silylation unit. The two reactants are allowed to react by a silylating reaction to produce a second intermediate product. At least a portion of this second intermediate product is backmixed continuously into the endcapping unit.

In one embodiment, the silylating step is carried out in a continuous process, where a first feed line delivers the prepolymer into the endcapping tubular reaction unit. A second feed line delivers the silylating agent into the endcapping unit where it is mixed continuously with the prepolymer and allowed to react to provide the second intermediate product. At least a first portion of the second intermediate product is conveyed from the silylation unit and is continuously backmixed upstream by means of a backmixing loop into a mixing chamber where it is mixed with fresh silylating agent before being directed back into the endcapping unit (i.e., the silylation unit) for extended residence time and further reaction. The backmixing may be used to adjust properties within the endcapping unit such as temperature, ratio of reactants to products, ratio of prepolymer to silylating agent and other reaction kinetics. The backmixing loop may also be formed to adjust properties in one or more other targeted process chambers without affecting process chambers not targeted.

In one embodiment, the silylating step is carried out as part of a continuous process where an upstream reaction chamber provides a first intermediate product from an outlet of the upstream reaction chamber towards an inlet of the endcapping unit. A feed stream provides the silylating agent from a silylating agent reservoir into the endcapping tubular reaction unit where it is mixed with the first intermediate product to provide the second intermediate product. At least a first portion of the second intermediate product is backmixed toward an inlet of the endcapping unit. In one embodiment, the backmixing loop directs a first portion of the silylated polymer composition from an outlet of a silylation unit towards the inlet of the silylation unit. In one embodiment, the backmixing loops delivers the first portion to at least one of a mixer, or a feed stream containing the prepolymer, or a feed stream containing the silylating agent before delivering the first portion to the inlet of the silylation unit. The backmixing decreases the mean residence time of the second intermediate product in the endcapping unit. An outlet of the endcapping unit provides at least another portion of the second intermediate product downstream toward an inlet of a downstream reaction chamber for further processing, analysis or storage. For the continuous process, various optional reaction chambers and reactions are provided upstream and downstream of the endcapping unit.

The first intermediate product is a prepolymer having reactive functional groups. Prepolymers suitable for use as the first intermediate product are preferably those having reactive functional groups selected from the group consisting of hydroxyl, amino, mercapto and isocyanato, preferably hydroxyl and isocyanato. It is particularly preferred that the prepolymer has terminal reactive functional groups.

In one embodiment, the continuous process has an endcapping tubular reaction unit that is used to react the prepolymer with the silylating agent followed by continuous backmixing as described above. In one embodiment, the first intermediate product is directed into an endcapping tubular reaction unit and a silylating agent is fed into the endcapping tubular reaction unit from a reservoir to react with the first intermediate product to produce a silylated polymer composition, as a second intermediate product. The continuous process includes optional reaction chambers upstream and downstream of the endcapping unit. The reaction chambers include upstream inlets for receiving reactants and downstream outlets for continuously providing the reaction products downstream toward downstream reaction chambers. The reaction chambers are in fluid contact (communication) with each other and with reactant reservoirs via feed lines which carry the feed streams of reactants. The feed lines deliver feed streams of reactants to the various reaction chambers.

In one embodiment, the process comprises an endcapping unit. Optional upstream process chambers include, for example, a mixing chamber upstream of a heat exchanger unit, which is upstream of a premixer of a chain extension unit, which is upstream of a chain extension unit, which is upstream of a premixer of the endcapping unit, which is upstream of the endcapping unit. Optional downstream process chambers include, for example, a premixer of a quenching unit, which is upstream of the quenching unit, which is upstream of at least one cooling unit, which is upstream of at least one analysis unit, which is upstream of a storage unit. When present, these reactions chambers are in fluid communication with each other and with the reactant reservoirs via the feed lines. A product from one upstream reaction chamber is communicated downstream towards another process chamber. Feed lines deliver feed streams of reactants into the various process chambers at inlets of the process chambers or at some intermediate location between the inlet of the process chamber and the outlet of the process chamber. The reactants in a reaction unit are heated, mixed, provided time for reaction, or any combination thereof such that a reaction product is produced and directed to an outlet of the reaction unit.

Although the process chambers and reactant reservoirs are described as optional in the above paragraph, in preferred embodiments at least one of the optional process chambers is present and at least one of the reactant reservoirs is present. In another embodiment, at least one reaction chamber is upstream of the endcapping unit and at least one reaction chamber is present downstream of the endcapping unit.

In the various reactions taking place in the various reaction chambers, the reactants are mixed, heated, reacted or any combination thereof. For example, the first intermediate product and the silylating agent are mixed, heated and reacted in the endcapping unit to provide the second intermediate product.

References made herein to reaction chambers encompass reactors known to those of ordinary skill in the art. Reaction units that are used in the process depend on the conditions under which the reaction unit will operate; such as the type of flow rate, the temperature, the reaction rate, the reactants, or the pressure. In one embodiment, the reaction unit is a tubular reactor with an internal static mixer. The reactor's ratio of length to diameter (L/D) can typically range from about 10:1 to about 50:1 although ratios outside of this range can be employed where appropriate. In an embodiment, the reaction is typically conducted at a temperature of up to about 200° C. In another embodiment, the reaction temperature can range from about 80° C. to about 170° C. In yet another embodiment, the reaction temperature can range from about 120° C. to about 150° C. The reactants are linearly moved through the reaction chambers. The residence time of reactants in the tubular reactor can typically be up to about 120 minutes, although any suitable residence time can be selected.

In one embodiment of the process the endcapping unit includes a variable diameter. In a continuous process, the variable diameter adjusts the flow rate of the reactants and products in the endcapping unit. A narrow diameter slows down the flow rate thereby increasing the residence time.

As a continuous process more than one process chamber is used, though they may all be tubular reactors, the dimensions may be different. However, in preferred embodiments, the reaction units are tubular reaction units. In some embodiments a singular tubular reactor may have a varying diameter such that the flow rate and residence time and therefore the reaction kinetics can be manipulated as desired. For example, in one specific embodiment, the endcapping unit is a tubular reactor with a variable diameter section that is varied to diameters corresponding to a desired flow rate or residence time in the unit or to a desired property of the final silylated polymer.

In certain embodiments, the variable diameter is used in conjunction with a backmixing loop to adjust the residence time of the second intermediate product in the silylation unit without affecting residence time of reactants in upstream or downstream process chambers such as the reaction units. The backmixing loop may have at least one pump or heat exchanger.

As noted above, the process for producing the silylated polymer includes a backmixing step as part of the silylating, step. In one embodiment, a continuous process is provided for producing the silylated polymer where the process includes a backmixing step. The backmixing step comprises removing at least a portion of the second intermediate product and delivering this portion towards an upstream inlet of the endcapping unit. In this embodiment, a first intermediate product is directed into the endcapping unit from an upstream reaction chamber and a silylating agent is fed into the endcapping unit and/or the backmixing loop from a feed line. While the sequence may be manipulated as desired, it is preferred that the first intermediate product is directed into the endcapping unit followed by the feeding of the silylating agent into the endcapping unit. The first intermediate product and the silylating agent are mixed to form a mixture and are allowed to react to produce a silylated polymer composition, as a second intermediate product. At least a portion of the second intermediate product is backmixed. The amount of the second intermediate product that is backmixed ranges from about 5 to about 95 weight percent, more specifically from about 20 to about 50 weight percent of the total weight of silylated polymer composition or the partially silylated polymer present therein. The backmixed portion of the second intermediate product allows for the adjustment of reaction parameters of upstream reaction units or upstream process steps.

For example, backmixing at least a portion of the second intermediate product to an upstream inlet or feed stream can adjust the reaction rate, flow rate, ratio of reactants, temperature which in turn adjust the properties of the second intermediate product. In one embodiment, the backmixed portion of the second intermediate product contains partially silylated polymer. The partially silylated polymer is backmixed into the feed stream delivering the silylating agent such that the partially silylated polymer can react with fresh silylating agent to bring the silylating reaction to completion or closer to completion such that the second intermediate product contains less unreacted reactive functional groups from the prepolymer or reactive groups from the silylating agent or other components of the second intermediate product.

In one embodiment, backmixing of at least a portion of the second intermediate product is by a backmixing means such that the process remains continuous. The backmixing means, for example, is a backmixing loop which is connected to an exit region of the endcapping unit, such as the outlet of the endcapping unit, or to a region between the midpoint of the endcapping unit and the outlet. The backmixing loop is connected such that a portion of the second intermediate product is fed from the exit region of the endcapping unit towards an entry region of the endcapping unit. The entry region includes the inlet of the endcapping unit, a feed line feeding another reactant into the endcapping unit, the premixer of the endcapping unit, or a portion of the endcapping unit between the middle of the endcapping unit and its inlet. Accordingly, the backmix loop forms a fluid communication between an exit region and an entry region of the endcapping unit. For example, in one embodiment, the backmix loop removes at least a first portion of the silylated polymer composition from an outlet of the endcapping unit and delivers it towards an inlet of the endcapping unit. By this backmixing loop, a portion of the second intermediate product is backmixed. A second portion of the silylated polymer composition is continuously fed downstream by the outlet of the endcapping unit towards a downstream process chamber. This allows the independent adjustment of properties of the endcapping unit without disturbing the continuity of the process and without affecting the upstream or downstream reaction chambers or reaction steps.

In another embodiment, the backmixing loop delivers the backmixed portion of the second intermediate product to an upstream process chamber separate from the endcapping unit. For example, it is contemplated within the scope of this disclosure that at least a portion of the second intermediate product is delivered to an upstream process chamber or upstream feed line to adjust a property within the upstream process chamber or upstream feed line such as temperature, reaction rate, flow rate, ratio of reactants or ratio of reactants to reaction products. For example, the backmixing loop delivers the backmixed portion to a premixer of the endcapping unit, a feed stream of the silylating agent, or any of the optional upstream process chambers described herein.

In one embodiment the backmixing loop delivers the backmixed portion directly to at least one of an inlet of the endcapping unit, an inlet of a premixer of the endcapping unit, an inlet of a jacketed static mixer, or an inlet of a variable tube mixer. In a preferred embodiment, the backmixed portion is premixed with the silylating agent before it is delivered to the endcapping unit. For example, the backmixed portion is premixed with the silylating agent in a jacketed static mixer before it is delivered to the endcapping tubular reaction unit.

The backmixing loop may be any tubular means known to those of ordinary skill in the art for suitably transporting a reaction product. This loop may also contain other features used to adjust properties of the backmixed portion of the second intermediate product or to adjust parameters of the reaction unit or reaction into which the backmixed portion is delivered. For example, a pump and/or a heat exchanger are used to direct the flow of the backmixed portion back into the endcapping unit. The pump allows the independent adjustment of at least one of the residence time, flow rates, the ratio of the reactants, the rate of reaction and viscosity and mechanical properties of the second intermediate product as well as any finally produced silylated polymer. For example, the backmixed portion will have its mean residence time decreased in the endcapping unit, which may reduce or eliminate the formation of byproducts during silylation reaction. In another embodiment, the backmixed portion will have a residence time in the backmixing loop, thereby increasing the total residence time which is the sum of the residence times in the endcapping tubular reaction unit and backmixing loop. The increase in total residence time of backmixed portion will allow the backmixed portion to proceed further towards a completed silylation reaction than if the second intermediate product was completely removed from the tubular reaction unit and did not have any backmixed portion. This reduces the amount of unreacted reactive groups in the second intermediate product, which in turn reduces viscosity creep and improves the values of the mechanical properties of the final silylated polymer. The heat exchanger allows the independent adjustment of the temperature in the endcapping unit. This can also be used to manipulate the reaction rate and to adjust the viscosity and mechanical properties of the second intermediate product and any finally produced silylated polymer. For example, increased temperatures can increase reaction rates while decreased temperatures can decrease reaction rates so that the rate of reaction in the endcapping unit can be independently controlled without affecting those parameters in any upstream or downstream process chambers. The pump and heat exchanger can be used alternatively or in combination to independently control the reaction properties in the endcapping unit.

In one embodiment, the backmixing of at least a portion of the second intermediate product adjusts at least one of the temperature, residence time, or ratio of second intermediate product to unreacted silylating agent or ratio of second intermediate product to first intermediate product. Suitable silylating agents, first intermediate product and second intermediate product are described herein. In a preferred embodiment, backmixing adjusts the weight ratio of second intermediate to first intermediate to a range of from about 0.05:1 to about 5:1, more specifically from about 0.1:1 to about 1:1, and even more specifically from about 0.2:1 to about 0.5:1. In a preferred embodiment the weight ratio of second intermediate product to silylating agent adjusted to a range of from about 500:1 to about 10:1; more specifically from about 100:1 to about 25:1.

In one embodiment, at least a portion of the second intermediate product is backmixed into a feed stream of fresh unreacted silylating agent by using a backmixing loop. The backmixing loop may have a pump and heat exchanger in series. The backmixing loop removes at least a first portion of the second intermediate product where the ratio of the weight of the first portion to the weight of the first intermediate product, the prepolymer, ranges from about 0.05:1 to about 5:1, more specifically from about 0.1:1 to about 1:1, and even more specifically from about 0.2:1 to about 0.5:1, and delivers it to a feed stream of fresh (i.e., unreacted) silylating agent upstream of the endcapping unit. The partially silylated polymer is mixed with the fresh silylating agent in a mixer downstream of the feed stream of the silylating agent and upstream of the endcapping unit to form a mixture. In another embodiment, the feed stream of the fresh (i.e., unreacted) silylating agent is added to the backmixing loop, thereby increasing the concentration of the fresh silylating agent in the backmixed portion of the second intermediate product and exposing the mixture of the fresh silylating product and second intermediate product to a residence time of the backmixing loop at the temperature of the backmixing loop. The feed stream of the fresh silylating agent may enter the backmixing loop at any point along the back mixing loop, preferably near the outlet of the endcapping unit. As used herein, "near the outlet" means that the inlet of the feed stream enters the back mixing loop at a point that is from about 1 to about 50 percent of the length of the backmixing, preferably from about 1 to about 10 percent of the backmixing loop, from the outlet of the endcapping unit that is providing the second intermediate product to the back mixing loop. In one embodiment, temperature of the feed stream is heated or cooled to increase or reduce the reaction rate, respectively, of the partially silylated polymer and the fresh silylating agent. The mixture is transported through the back mixing loop to the endcapping unit. The reaction product is a silylated polymer and/or a silylated polymer composition containing a silylated polymer, such as a moisture-curable silylated polymer, unreacted silylating agents and partially silylated polymer from the silylation reaction. Upon sufficient completeness of the reaction, as indicated by the content of the isocyanate level, the silylated polymer composition is either removed from the endcapping unit or optionally transported downstream to a quenching unit for quenching with a scavenging package to remove or reduce any remaining unreacted reactive functional groups present in the silylated polymer composition.

A predetermined level of reaction completeness can be determined by methods apparent to those of skill in the art. For example, by titration or infra-red spectroscopy which allows the determination of the level of isocyanate groups present over time.

The silylating step comprises mixing and reacting a prepolymer having reactive functional groups, as a first intermediate product, with a silylating agent to produce the silylated polymer composition, as the second intermediate product. The prepolymer has at least one reactive functional group. In a preferred embodiment, the prepolymer contains at least two reactive functional groups. In a more preferred embodiment, the prepolymer contains at least two terminal reactive functional groups.

In one embodiment, the prepolymers, having reactive functional groups, are polyols or polyols that have been chain extended to form chain extended prepolymers.

In one embodiment, the first intermediate product is of general Formula (1):

wherein $R^1$ is an organic group containing from about 50 to about 4,000 carbon atoms and at least one functional group selected from group consisting of —O—, —S—, —OC(=O)NH—, —R$^2$NC(=O)NH—, —C(=O)O—, —OC(=O)O—, —OCHR$^2$O—, —C(=O)NR$^2$—, —NR$^2$— and —CR$^2$=CHR$^2{}_2$, wherein each occurrence of $R^2$ is independently hydrogen, an alkyl group containing from 1 to about 6 carbon atoms or phenyl, preferably hydrogen;

each occurrence of X is independently a reactive functional group selected from the group consisting of —OH, —SH, —NR$^3$— and —N=C=O, wherein each occurrence of $R^3$ is independently hydrogen, an alkyl group of from 1 to about 6 carbon atoms or phenyl, preferably hydrogen; and the subscript a is an integer from 1 to about 5.

In one embodiment, where the prepolymer having reactive functional groups is a polyol, the reactive functional groups include the hydroxyl groups. It is preferred that the polyol prepolymer contains terminal hydroxyl groups as the reactive functional groups. Where the prepolymer is a chain extended polyol prepolymer, the reactive functional groups may be hydroxyl groups, isocyanate groups, or both hydroxyl and isocyanate groups. As with the polyols, it is preferred that the chain extended polyols have terminal reactive functional groups, whether they are hydroxyl, isocyanate or both.

The chain extended prepolymers can be produced by methods known to those of skill in the art without undue experimentation. For example, the chain extended prepolymer can be produced by a chain extension reaction wherein a polyol is continuously mixed with a chain extension agent and allowed to react to produce the chain extended polyol.

The chain extension reaction can be carried out in various ways depending on the desired properties of the chain extended polyol. For example, while various suitable chain extension agents are described herein, polyisocyanates are well suited as chain extension agents. In one embodiment, where it is desired to have a chain extended polyol with terminal hydroxyl groups as reactive functional groups, the chain extended polyol can be produced by continuously mixing a molar excess of polyol with the polyisocyanate to produce the prepolymer with terminal hydroxyl functional groups, as the first intermediate product. A molar excess of polyol in the chain extension reaction produces an OH:NCO molar ratio greater than about 1:1. In more specific embodiments the OH:NCO molar ratio ranges from about 1.1:1 to about 10:1, even more specifically, from about 1.5:1 to about 3:1, and even more specifically from about 1.8:1 to about 2.2:1.

In one embodiment, where it is desired to have a chain extended polyol where the reactive functional groups are terminal isocyanate groups, the chain extended polyol can be produced by continuously mixing a molar excess of polyisocyanate with the polyol to produce the prepolymer with terminal isocyanate functional group, as the first intermediate product. A molar excess of polyisocyanate in the chain extension reaction produces an OH:NCO molar ratio less than about 1:1. In more specific embodiments the OH:NCO molar ratio ranges from about 0.1:1 to about 0.9:1, even more specifically, from about 0.3:1 to about 0.7:1, and even move specifically from about 0.45:1 to about 0.55:1.

In one embodiment, where it is desired to have a chain extended polyol where the reactive functional groups are a mix of both terminal hydroxyl and terminal isocyanate groups, the chain extended polyol can be produced by continuously mixing a stoichiometric molar amount of polyol with the polyisocyanate, a molar excess of polyol with the polyisocyanate, or a molar excess of polyisocyanate with the polyol and not to allow the reaction of the polyol and polyisocyanate to proceed to completion to produce the prepolymer having terminal hydroxyl and isocyanate functional groups, as the first intermediate product. A stoichiometric equivalent, molar excess of polyol or molar excess of polyisocyanate in the chain extension reaction which was not allowed to go to completion produces a first intermediate product where the OH:NCO molar ratio is about to 1:1. In more specific embodiments the OH:NCO molar ratio ranges from about 0.5:1 to about 1.5:1, and even more specifically, from about 0.9:1 to about 1.1:1.

Suitable first intermediate products include without limitation, for example, polyols with terminal hydroxyl groups, chain extended polyols with terminal hydroxyl groups, chain extended polyols with terminal isocyanate groups, and chain extended polyols with both terminal isocyanate groups and terminal hydroxyl groups.

Polyols suitable for use as the first intermediate product or for forming the chain extended polyol include those with terminal hydroxyl groups as reactive functional groups. Suitable hydroxyl-terminated polyols include, but are not limited to, polyether polyols, polyester polyols such as the hydroxyl-terminated polycaprolactones, polyetherester polyols such as those obtained from the reaction of polyether polyol with ε-caprolactone, polyesterether polyols such as those obtained from the reaction of hydroxyl-terminated polycaprolactones with one or more alkylene oxides such as ethylene oxide and propylene oxide, hydroxyl-terminated polybutadienes and hydroxy-terminated polyurethane prepolymers derived therefrom, e.g., by the reaction of a slight excess of one or a mixture of said polyols with one or a mixture of polyisocyanates. The polyols may also include polyesteramides, polyethers, polythioethers, polycarbonates, and polyacetals. Where appropriate, the polyols may contain free tertiary amino groups.

Some specific suitable polyols include, but are not limited to, the polyether diols, in particular, the poly(oxyethylene) diols, the poly(oxypropylene)diols and the poly(oxyethylene-oxypropylene)diols, polyoxyalkylene triols, polytetramethylene glycols, polyacetals, polyhydroxy polyacrylates, polyhydroxy polyester amides and polyhydroxy polythioethers, polycaprolactone diols and triols, and the like.

In one embodiment of the present invention, the polyols used in the production of the silylated polyurethane resins are poly(oxyethylene)diols with number average molecular weights from about 500 to about 25,000 grams per mole (g/mol). In another embodiment of the present invention, the polyols used in the production of the silylated polyurethane resins are poly(oxypropylene)diols with number average molecular weights from about 1,000 to about 20,000 grams per mole. Mixtures of polyols of various structures, molecular weights and/or functionalities can also be used.

In one embodiment, the number average molecular weight of the polyols is calculated from the hydroxyl number of the polyol and the functionality of the polyol. The hydroxyl number of the polyol is determined in accordance with ASTM D4274-11, Standard Test Methods for Testing Polyurethane Raw Materials: Determination of Hydroxyl Numbers of Polyols.

Other polyether polyols which may be used include, but are not limited to, products obtained by the polymerization of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include, but are not limited to, polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran.

Polyethers containing free tertiary amino groups may be obtained by the oxyalkylation, for example oxypropylation, of ammonia, primary or secondary amines and aminoalcohols. Non-limiting examples of suitable amines include ethylene diamine, aniline, benzylamine, toluene diamines, diaminodiphenylmethane and polymethylene polyphenyl polyamines. Suitable aminoalcohols include ethanolamine, diethanolamine, triethanolamine, N-methyldiethanolamine, bis(2-hydroxyethyl)aniline, bis(2-hydroxypropyl)aniline and bis(2-hydroxyethyl)benzylamine. In the oxyalkylation process, mixtures of amino-containing and amino-free initiators may be used if desired.

Polythioether polyols are also suitable polyols. These include, for example, products obtained by condensing thiodiglycol either alone or with other glycols, dicarboxylic acids, formaldehyde, aminoalcohols or aminocarboxylic acids.

Polycarbonate polyols are also suitable polyols. These include, for example, products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols are also suitable polyols. These include, for example, glycols such as diethylene glycol, triethylene glycol and hexanediol with formaldehyde. Suitable polyacetals may also be prepared by polymerising cyclic acetals.

Suitable polyolefin polyols include, for example, hydroxyl-terminated butadiene homo- and copolymers.

Diols having pendent polyoxyethylene chains which may be used in the preparation of the prepolymer include those described in U.S. Pat. No. 3,905,929, for example, which is incorporated by reference in its entirety herein.

Suitable polyester polyols include, for example, hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerization of lactones, for example caprolactone, in conjunction with a polyol may also be used. Polyesteramides may be obtained by the inclusion of amino-alcohols such as ethanolamine in polyesterification mixtures. Polyesters containing free tertiary amino groups may be obtained by including tertiary amino polyols, for example triethanolamine or N-methyldiethanolamine in the polyesterification reaction.

The polyether polyols can have up to about 5 hydroxyl groups per polymer chain and more specifically have a functionality of from about 1 to 2 hydroxyl groups per polymer chain and most specifically, a functionality of about 2 hydroxyl groups per polymer chain (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505; 3,941,849; 4,242,490; 4,335,188; 4,687,851; 4,985,491; 5,096,993; 5,100,997; 5,106,874; 5,116,931; 5,136,010; 5,185,420; and 5,266,681, the entire contents of each of which are incorporated herein by reference. Polyether polyols produced in the presence of double-metal cyanide catalysts tend to have high molecular weights and low levels of unsaturation, properties of which, it is believed, are responsible for the improved performance. The polyether polyols specifically have a number average molecular weight of from about 1,000 to about 25,000 grams per mole, more specifically from about 2,000 to about 20,000 grams per mole, and even more specifically from about 4,000 to about 18,000 grams per mole. In one embodiment of the invention, the polyether polyols have an end group unsaturation level of no greater than about 0.04 milliequivalents per gram of polyol. In another embodiment of the invention, the polyether polyol has an end group unsaturation of no greater than about 0.02 milliequivalents per gram of polyol. The amount of unsaturation is determined in accordance with ASTM D4671-05 (2010)e1, Standard Test Method for Polyurethane Raw Materials Determination of Unsaturation of Polyols.

In still another embodiment the prepolymer containing reactive functional groups of formula (1) more particularly have the structures selected from the group consisting of Formulae (2), (3) and (4):

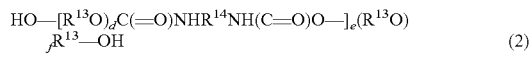

(2)

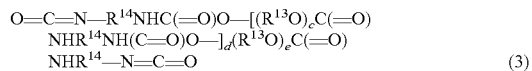

(3)

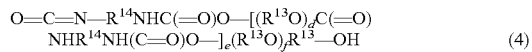

(4)

wherein each occurrence of $R^{13}$ is independently selected from the group consisting of an alkylene group of from about 2 to about 10 carbon atoms, a cycloalkylene group of from about 5 to about 10 carbon atoms, arylene group of from about 6 to about 10 carbon atoms and aralkylene group of from about 7 to about 12 carbon atoms, each occurrence of $R^{14}$ is independently selected from the group consisting of an alkylene group of from 1 to about 10 carbon atoms, a cycloalkylene group of from about 5 to about 12 carbon atoms, arylene group of from about 6 to about 10 carbon atoms, aralkylene group of from 7 to 12 carbon atoms, and the subscripts d, e and f are integers and each occurrence of d is from 1 to about 500, e is from 0 to about 5, and f is from 1 to about 500, with the proviso that (d)(e)+f is greater than or equal to about 25.

In yet another embodiment, the prepolymer having reactive functional groups is of Formula (2), (3) or (4) or mixtures thereof. In one particular embodiment, each $R^{13}$ is independently ethylene or propylene, preferably propylene, each $R^{14}$ is independently hexylene, methylphenylene or

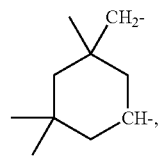

c is from about 100 to about 500, preferably from about 125 to about 225, d is 0, 1 or 2, preferably 0 or 1, e is from about 100 to about 500, preferably from about 125 to about 225.

In one embodiment, the silylating agent has the general Formula (5):

(5)

wherein

Y is a functional group selected from the group consisting of —N=C=O, —SH, —OH and —NHR$^6$, where R$^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and CH[(C=O)OR$^7$]CHR$^8$C(=O)OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —R$^9$(OR$^{10}$)$_c$OR$^{11}$, where R$^9$ is an alkyl group of from 1 to about 18 carbon atoms, R$^{10}$ is a divalent alkylene group of from about 2 to about 4 carbon atoms, and R$^{11}$ is an alkyl group of from 1 to about 10 carbon atoms or —C(=O)R$^{12}$, where R$^{12}$ is hydrogen, or an alkyl group of from 1 to about 6 carbon atoms, and the subscripts b and c are integers where b is 0 to about 2 and c is 0 to about 5.

In a particular embodiment, the process for preparing a moisture-curable silylated polymer comprises:

(a) continuously adding a prepolymer containing reactive functional groups to an endcapping tubular reaction unit;

(b) continuously adding a silylating agent to the prepolymer containing reactive functional groups in the endcapping tubular reaction unit of step (a);

(c) continuously reacting the mixture of step (a) to provide a silylated polymer composition comprising a partially silylated polymer;

(d) continuously removing, by a backmixing loop, a portion of the first silylated polymer composition of step (c) from the endcapping tubular reaction unit;

(e) continuously mixing the first silylated polymer composition of step (d) with additional silylating agent to form a second composition;

(f) continuously adding the backmixed mixture of step (e) to the endcapping tubular reaction unit containing the first composition;

(g) continuously reacting the backmixed portion of step (f) and the silylating agent in the endcapping tubular reaction unit to provide a silylated polymer composition containing a moisture-curable silylated polymer; and (h) continuously removing at least a portion of the composition from step (g) to provide for the moisture-curable silylated polymer.

The first composition of step (c) is removed from the endcapping tubular reaction unit of step (d) by means of a backmixing loop. One end of the backmixing loop is attached to the endcapping tubular reaction unit near the output line of the unit, or directly to the output line and the other end of the backmixing loop is attached near the input line of the endcapping tubular reaction unit, to the input line of the prepolymer containing reactive functional groups or to the input line of the silylating agent. The backmixing unit optionally comprises a mixer, a heat exchanger for controlling the temperature of the backmixing unit, and/or a feed line for the silylating agent. Because steps (d) to (h) are carried out continuously, a steady state can be established where the first composition of step (d) and the moisture-curable silylated polymer of step (h) have similar or identical compositions.

In one embodiment, the prepolymer containing reactive functional groups is a stabilized prepolymer prepared from mixing a stabilization package with a polyol before reaction with the silylating agent, or mixing a stabilization package with a polyol and reacting the mixture of the polyol and stabilizing package with a polyisocyanate to form a mixture of the prepolymer having reactive functional groups and a stabilization package, where the functional groups are hydroxyl groups, isocyanate groups or a mixture of hydroxyl groups and isocyanate groups, and where the prepolymer having reactive functional groups is chain extended by the reaction of the polyol with the polyisocyanate. Applicant has found that by incorporating the stabilization package early in the process, the discoloration of the produced silylated polymer is reduced. The stabilization package includes a stabilizing agent which reduces the discoloration in the silylated polymer.

Accordingly, in a second aspect the continuous process of producing a silylated polymer comprises a silylating step with backmixing, and a stabilization step. The silylating step with backmixing comprises reacting a stabilized prepolymer having reactive functional groups, as a first intermediate product, with a silylating agent to produce a silylated polymer, as a second intermediate product. The silylating step also includes a step of backmixing, by means of a backmixing loop, in which at least a portion of the second intermediate product as described elsewhere herein is backmixed with the silylating agent, prepolymer having reactive functional groups or silylating agent and prepolymer having reactive functional groups.

For example, stabilizing the prepolymer reduces the degree of color change that results during the preparation of a prepolymer containing reactive functional groups, when the prepolymer is the reaction product of a polyol and a polyisocyanate, and during the preparation of the silylated polymer by the reaction of the prepolymer containing reactive functional groups and the silylating agent. The stabilizing package also prevents or minimizes the change in color as the silylated polymer ages. Methods of quantifying the change in color are well known to those of ordinary skill in the art. However, exemplary means of quantifying the change includes measuring the color of the reactants, such as the polyol, polyisocyanates, and/or mixtures comprising the polyol and polyisocyanate, prepolymer containing reactive functional groups and/or mixtures comprising the prepolymer containing reactive functional groups and the silylating agent and measuring the color of the product, the silylated polymer. In one embodiment, color change is measured on the silylated polymer prepared with the first intermediate product containing the stabilization package and on the silylated polymer prepared with the first intermediate which did not contain the stabilization package. In another embodiment, the color change is measured on the silylated polymer prepared from the reaction of a polyol containing the stabilization package and a polyisocyanate, which is subsequently reacted with the silylating agent and on the silylated polymer prepared from the reaction of a polyol which did not contain the stabilization package and a polyisocyanate, which is subsequently reacting with the silylating agent. In still another embodiment, the change in color can also be determined by measuring the color of the silylated polymer as made and after the silylated polymer has aged. In one embodiment, the change in color as made subtracted from the color after aging at 80° C. for four days is referred to as color stability. The color stability is from about 0 Pt—Co to about 40 Pt—Co color, more specifically from about 0 Pt—Co to about 25 Pt—Co, and even more specifically from about 0 Pt—Co to 10 Pt—Co. The color stability and color of the reactants, first intermediate product and second intermediate product and the silylated polymer is determined in accordance with ASTM Method D1209, "Standard Test Method for Color of Clear Liquids (Platinum-Cobalt Scale)".

The stabilization package comprises at least one phosphite stabilizer and optionally, at least one sterically hindered phenol antioxidant, and preferably the stabilizer package comprises at least one phosphite stabilizer and at least one phenol antioxidant. The term "sterically hindered phenol antioxidant", as used herein, refers to an organic compound in which a hydroxyl group is chemically bonded to an aromatic hydrocarbon carbon atom and in which the adjacent carbon atoms to the carbon containing the hydroxyl group are bonded to a secondary or preferably a tertiary carbon atom of an alkyl group. In an embodiment, sterically hindered phenol antioxidants useful in the invention may be described by the general Formula (6):

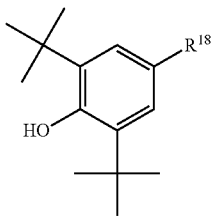
(6)

wherein in Formula (6), each occurrence of $R^{18}$ is a monovalent or polyvalent organic radical of from 1 to about 50 carbon atoms and optionally containing substituents selected from group consisting of hydroxyl group, —OH; amide group, —C(=O)N(—)$_2$; ester group, —C(=O)O—; isocyanurate group

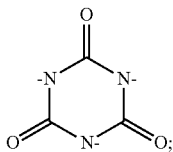

ether group, —O—; amine group, (—)$_2$NH; hydrazide; —C(=O)N(—)NH(—)$_2$—; sulfide group, —S—; and combinations thereof.

Specifically, the sterically hindered phenol antioxidant may have a molecular weight of between about 300 grams/mole to about 1,500 grams/mole. More specifically, the sterically hindered phenol antioxidant may contain at least two phenolic groups per molecule having the general formula (7):

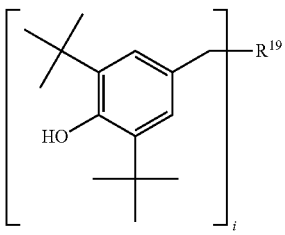
(7)

wherein $R^{19}$ is a divalent, trivalent or tetravalent organic group of from 1 to about 50 carbon atoms and optionally containing substituents selected from group consisting of a hydroxyl group, —OH; amide group, —C(=O)N(—)$_2$; ester group —C(=O)O—; isocyanurate group

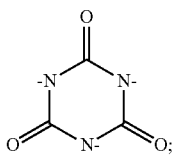

ether group, —O—; amine group, (—)$_2$NH; hydrazide, —C(=O)N(—)NH(—)$_2$—; sulfide group, —S—; and combination thereof; and the subscript i is an integer of from about 2 to about 4.

Representative and non-limiting examples of sterically hindered phenol antioxidants include 4-[[3,5-bis[(3,5-di-tert-butyl-4-hydroxyphenyl)methyl]-2,4,6-trimethylphenyl]methyl]-2,6-di-tert-butylphenol; octadecyl 3-(3,5-di-tert-butyl-4-hydroxyphenyl) propanoate; 3-(3,5-di-tert-butyl-4-hydroxyphenyl)-N'-[3-(3,5-di-tert-butyl-4-hydroxyphenyl) propanoyl]propanehydrazide; ethylenebis(oxyethylene)bis-3,5-tert-butyl-4-hydroxy-m-tolyl)-propionate, pentaerythritol tetrakis(3-(3,5-di-tert-4-hydroxyphenyl) propionate; thiodiethylene bis[3-(3,5-di-tert-butyl-4-hydroxyphenyl)propionate-N,N'-hexane-1,6-diylbis(3-(3,5-di-tert-butyl-4-hydroxylphenylpropionamide); 1,3,5-tris-(3,5-di-tert-butyl-4-hydroxybenzyl)-1,3-5-triazine-2,4,6(1H,3H,5H-)-trione; 3,5-di-tert-buytl-4-hydroxy-toluene; 4,4-methylene-bis(3,5-di-tert-butylphenol), and mixtures thereof.

The phosphite processing stabilizer is a secondary antioxidant that reacts with hydroperoxides that form on the polymer during processing and prevents process induced degradation and extends the performance of the sterically hindered phenol antioxidants. The phosphite processing stabilizer contains three oxygen phosphorus single bonds. Specifically, the phosphite processing stabilizer has the general Formula (8):

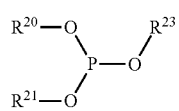
(8)

wherein
each occurrence of $R^{20}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{21}$ group;

each occurrence of $R^{21}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{20}$ group; and each occurrence of $R^{22}$ is independently a monovalent hydrocarbon containing 1 to about 25 carbon atoms and optionally containing at least one heteroatom selected from the group consisting of oxygen atom, nitrogen atoms and sulfur atom.

In particular, the phosphite processing stabilizer may contain $R^{20}$, $R^{21}$ and $R^{22}$ groups that are monovalent alkyl groups, aryl groups or alkyl-substituted aromatic hydrocarbon groups.

Representative and non-limiting examples of phosphite stabilizers include triisodecyl phosphite; triphenyl phosphite; tris(2,4-di-tert-butylphenyl)phosphite, 2-(2,4,8,10-tetratert-butylbenzo[d][1,3,2]benzodioxaphosphepin-6-yl)oxy-N,N-bis[2-(2,4,8,10-tetratert-butylbenzo[d][1,3,2]

benzodioxaphosphepin-6-yl)oxyethyl]ethanamine; bis(2,4-di-tert-butyl-6-methylphenyl)-ethyl-phosphite; 3,9-bis-(2,4-di-tert-butyl-phenoxy)-2,4,8,10-tetraoxa-3,9-diphospha-spiro[5.5]undecane; and mixtures thereof.

In an embodiment where the process is a continuous process, the stabilizers are added by a teed stream to an upstream mixing chamber, into an inlet of the premixer of the chain extension unit, into the chain extension unit, into the premixer of the endcapping unit, into an inlet of the endcapping unit, into an inlet of the backmixing loop, or any combination thereof. In a preferred embodiment, the stabilizer package is initially mixed with the polyol in an initial process step. For example, the stabilizer package is added into the mixing chamber and is mixed with the polyol or the polyol and the other components. Adding the stabilizing agents to the polyol before the chain extension and endcapping reactions provide for low color products. In one embodiment, the silylated polymer, more specifically the moisture-curable silylated polyurethane polymer produced using the stabilizer package provides for a silylated polymer with color less than 50 Pt—Co, more specifically less than 20 Pt—Co, and even more specifically less than 10 Pt—Co, as measured in accordance with ASTM D1209, Standard Test Method for Color of Clear Liquids (Platinum-Cobalt Scale).

In one embodiment, the stabilizers are selected from the group consisting of hindered phenols and phosphites available as Specialty Chemicals under the tradenames "Anox 20" and "Uvasil 299 HM/LM" (Great Lakes), "Doverphos 6" (Dover Chemical) and "Irganox 1010," "Irganox 1076," "Tinuvin 770," "Tinuvin 327," "Tinuvin 213" and "Tinuvin 622 LD" (Ciba), respectively.

In one particular embodiment, the stabilizers are a blend of hindered phenol and phosphites. The weight ratio of the hindered phenol to phosphite is from about 1 to about 99 weight percent hindered phenol, more specifically from about 2 to about 50 weight percent hindered phenol, and even more specifically, from about 3 to about 15 weight percent hindered phenol, based on the total weight of the hindered phenol and phosphite.

In certain embodiments, the first intermediate product is a chain extended polyol. Suitable chain extended polyols will be apparent to those of ordinary skill in the art. However, in a specific embodiment, the chain extended polyol is a chain extended polyol that is extended by reaction with a chain extension agent. While various chain extension agents are contemplated, in specific embodiments the chain extension agents are polyisocyanates. As noted herein, the chain extended polyols are prepared by a chain extension reaction wherein a polyol is directed into a reaction chamber and a chain extension agent is directed into the reaction chamber where they are continuously mixed and reacted to form the chain extended polyol. As noted, the resulting chain extended polyol will contain reactive functional groups and in particular embodiments will contain terminal reactive functional groups. The reactive functional groups can be hydroxyl, isocyanate or both. Which reactive group is present on the chain extended polyol will depend on the ratio of the reacting polyol and chain extension agent in the continuous chain extension reaction. An excess of polyol relative to the polyisocyanate, for example, will produce a prepolymer with reactive function groups which is chain extended polyol with hydroxyl reactive functional groups. By contrast, an excess of polyisocyanate, for example, will produce a prepolymer with reactive function groups which is a chain extended polyol with isocyanate reactive functional groups. Correspondingly, an excess of polyisocyanate, an excess of polyol or equal amounts of polyol and polyisocyanate will produce a prepolymer with reactive function groups which is a chain extended polyol with both hydroxyl and isocyanate reactive functional groups, provided that the reaction is not allowed to proceed to completion.

In one embodiment, the molar ratio of hydroxyl groups of the polyol to isocyanate groups of the polyisocyanate, OH:NCO molar ratio, is from about 0.1:1 to about 10:1 and more specifically from about 0.3:1 to about 3:1, and even more specifically from 0.45:1 to about 2.2:1.

In one embodiment, chain extended polyols are prepared by the reaction of hydroxyl-terminated polymers with di- or polyisocyanates, where the molar ratio of the hydroxyl groups of the hydroxyl-terminated polymer to the isocyanate groups of the polyisocyanate, OH:NCO molar ratio, is from about 1.1:1 to about 10:1, more specifically from about 1.5:1 to about 3:1, and even more specifically, from about 1.8:1 to about 2.2:1.

Polyols prepared by the reaction of hydroxyl-terminated polymers with di- or polyisocyanates may contain residual isocyanate, either from partially reacted di- or polyisocyanate, or from unreacted di- or polyisocyanate. In still another embodiment, the molecular weight of the polyols can be increased by reacting them with low molecular weight glycols, triols or higher functionality alcohols, di- or polyamines, polysiloxanes containing pendent and/or terminal hydroxyl or amino groups with di- or polyisocyanates.

Several chain extension agents are suitable for use in the disclosed process. Polyisocyanates are particularly preferred chain extension agents. Diisocyanates, or mixtures thereof, are particularly preferred. For example, the polyisocyanate can be diphenylmethane diisocyanate ("MDI"), polymeric diphenylmethane diisocyanate ("pMDI"), paraphenylene diisocyanate, naphthalene diisocyanate, liquid carbodiimide-modified MDI and derivatives thereof, isophorone diisocyanate (IPDI), dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof. In one embodiment of the invention the diisocyanate is at least one member selected from the group consisting of hexamethylene diisocyanate, phenylene diisocyanate, toluene diisocyanate, 4,4'-diphenylmethane diisocyanate and various isomers thereof, isophorone diisocyanate, dicyclohexylmethane diisocyanate, cyclohexane diisocyanate and 1,3-bis-(isocyanatomethyl)cyclohexane.

The chain extension reaction can produce chain extended polyols with terminal hydroxyl groups, terminal isocyanate groups or both, as the reactive functional groups. The reactive functional groups produced from the chain extension reaction will be affected by the relative amounts of polyol and chain extension agent. For example, to produce a chain extended polyol with hydroxyl groups, a molar excess of polyol is reacted with the polyisocyanate. To produce a chain extended polyol with isocyanate groups, as the reactive functional groups, a molar excess of polyisocyanate is reacted with the polyol. To produce a chain extended polyol with a mixture of hydroxyl groups and isocyanate groups, as the reactive functional groups, a stoichiometric amount of polyol and polyisocyanate, a molar excess of polyol or a molar excess of polyisocyanate is used and the reaction between the polyol and polyisocyanate is not allowed to go to completion.

In one embodiment, the molar ratio of hydroxyl groups of the polyol to isocyanate groups of the polyisocyanate is such that the hydroxyl groups are more than stoichiometric amounts. More specifically, the molar ratio of HO— groups to —N═C═O groups (OH:NCO) is from about 95:1 to about 1.05:1, even more specifically, from about 5:1 to about 1.10:1, and yet even more specially from about 3:1 to about 1.20:1.

In one embodiment, the molar ratio of hydroxyl groups of the polyol to isocyanate groups of the polyisocyanate is such that the hydroxyl groups and isocyanate groups are almost in stoichiometric amounts. More specifically, the molar ratio of HO— groups to —N═C═O groups is from about 1:1.05 to about 1:2, even more specifically, from about 1:1.10 to about 1:1.8, and yet even more specifically from about 1:1.2 to about 1:1.5.

In one embodiment, the molar ratio of hydroxyl groups of the polyol to isocyanate groups of the polyisocyanate is such that the hydroxyl groups are less than stoichiometric amounts. More specifically, the OH:NCO molar ratio is from about 0.1:1 to about 0.9:1, even more specifically from 0.3:1 to about 0.7:1 and yet even more specifically from about 0.45:1 to about 0,55:1. The reaction product will be a prepolymer containing reactive functional groups where the functional groups are isocyanate groups.

Examples of commercially available polyols include the Arcola® polyol family and the Acclaim® polyol family of polyether polyol products which are used in a variety of polyurethane applications, such as, for example, adhesives, sealants, elastomers, molded foams and flexible foams.

The prepolymers of polyols or chain extended polyols, function as the first intermediate product and are delivered to the endcapping unit for mixing and reaction with the silylating agent to form the second intermediate product.

In a continuous process, the chain extension reaction takes place in a reaction chamber upstream of the endcapping unit. This reaction chamber is referred to herein as the chain extension unit. The chain extension unit is connected with the endcapping unit either directly or through a line which connects the two units together, such that the chain extended polyol is transported from the chain extension unit to the endcapping unit as described further herein.

The reaction unit for the chain extension reaction will be referred to herein generally as the extension unit.

While it is contemplated within the scope of this disclosure that the process is a continuous process and that the reaction units upstream and downstream of the endcapping unit may be optional, it is preferred that the extension unit is present upstream of the endcapping tubular reaction unit and is connected directly or by means of a line with the endcapping tubular reaction unit such that there is fluid communication between the two units. The chain extended polyol formed in the extension unit by the chain extension reaction is delivered by continuous process to the endcapping tubular reaction unit as the first intermediate product.

While suitable chain extension units for carrying out the chain extension reaction will be readily apparent to those of ordinary skill in the art, it is contemplated herein that the extension unit is, for example, a tubular reactor with an upstream inlet and a downstream outlet as described herein. In one embodiment, the polyol is delivered or fed into the extension unit by a delivery means such as by hand or by automation or by an outlet of an upstream process unit. The chain extension agent is likewise delivered or fed to the extension unit by a delivery means such as by hand or by automation or by an outlet of an upstream process unit or from an upstream reservoir. The polyol and chain extension agent may be fed into the extension unit simultaneously or alternatively, though it is preferred that the reactant with the higher mass will be fed in first. The polyol and the chain extension agent are allowed to mix and react in the extension unit to produce the prepolymer having reactive functional groups, specifically the chain extended polyol, as a first intermediate product.

In embodiments where the prepolymer having reactive functional groups is a polyol, the extension unit is optional since extension of the polyol is not required.

In one particular embodiment, the process of preparing a silylated polymer comprises a silylating step with backmixing where the prepolymer having reactive functional groups is a chain extended polyol. The process comprises:
  (aa) continuously adding a polyol containing from about 0.001 to about 5 weight percent, more specifically about 0.1 to about 2 weight percent, and even more specifically about 0.5 to about 1 weight percent of a sterically hindered phenol and from about 0.001 to about 5 weight percent, more specifically about 0.1 to about 2 weight percent, and even more specifically about 0.5 to about 1 weight percent of a phosphite stabilizer, where the weight percents are based on the weight of the polyol, to an extension unit;
  (bb) continuously adding a polyisocyanate and optionally a catalyst for promoting the reaction of the polyol with the polyisocyanate to the extension unit;
  (cc) continuously reacting the polyol with the polyisocyanate to generate a prepolymer having reactive functional groups which is a polyurethane, as a first intermediate product;
  (dd) continuously transporting the first intermediate product from step downstream to an endcapping tubular reaction unit;
  (ee) continuously adding a silylating agent to the endcapping tubular reaction unit containing the first intermediate product, a line that connects the extension unit and the endcapping tubular reaction unit containing the first intermediate product, a backmixing loop containing the second intermediate product which is subsequently feed into the endcapping tubular reaction unit or a mixer containing the first intermediate product of step (dd) to form a mixture;
  (ff) continuously reacting the mixture of step (ee) to provide for a silylated polymer composition, as a second intermediate product;
  (gg) continuously removing, by backmixing, a portion of the second intermediate product of step (ff) from the endcapping tubular reaction unit;
  (hh) continuously backmixing the portion of step (gg) into a feed of fresh silylating agent to form a second mixture;
  (ii) continuously adding the second mixture of step (hh) to the endcapping tubular reaction unit containing the first intermediate product;
  (jj) continuously reacting the mixture of step (ii) in the endcapping tubular reaction unit to produce second intermediate product;
  (kk) continuously removing a portion of the second intermediate product of step (jj) to provide for the silylated polymer, which is moisture-curable silylated polyurethane; and optionally,
  (ll) continuously quenching the moisture-curable silylated polyurethane with a scavenging package.

The silylating agents suitable for the silylation reaction will depend on the reactive functional groups that are present on the first intermediate product. For example, where the reactive functional groups of the first intermediate product include a hydroxyl, the silylating, agent will have corresponding functional groups that are reactive with the hydroxyl group of the first intermediate product. In one example, the first intermediate product is a polyol and the silylating agent contains an isocyanate (i.e., NCO) functional group. Where the first intermediate product includes isocyanate reactive functional groups, the silylating agent contains an amino (i.e., —NHR), hydroxyl (i.e. —OH) or thiol (i.e., —SH) functional group.

Suitable silylating agent have the general Formula (5):

$$YR^4Si(CH_3)_b(OR^5)_{3-b} \qquad (5)$$

wherein

Y is a functional group selected from the group consisting of —N=C=O, —SH, OH and —NHR$^6$, where R$^6$ is selected from the group consisting of hydrogen, an alkyl group containing 1 to about 10 carbon atoms, cycloalkyl group containing from about 5 to about 10 carbon atoms, an aralkyl group containing from about 7 to about 10 carbon atoms, phenyl and CH[(C=O)OR$^7$]CHR$^8$C(=O)OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

R$^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of R$^5$ is an alkyl group of from 1 to about 18 carbon atoms or a —R$^9$(OR$^{10}$)$_c$OR$^{11}$, where R$^9$ is an alkyl group of from 1 to about 18 carbon atoms, R$^{10}$ is a divalent alkylene group of from about 2 to about 4 carbon atoms, and R$^{11}$ is an alkyl group of from 1 to about 10 carbon atoms or —C(=O)R$^{12}$, where R$^{12}$ is hydrogen, or an alkyl group of from 1 to about 6 carbon atoms; and the subscripts b and c are integers where b is 0 to about 2 and c is 0 to about 5.

In one embodiment, X is —OH and Y is —N=C=O. In another embodiment, X is —N=C=O and Y is —NHR$^6$, where R$^6$ is selected from the group consisting of hydrogen, an alkyl group containing 1 to about 10 carbon atoms, cycloalkyl group containing from about 5 to about 10 carbon atoms, an aralkyl group containing from about 7 to about 10 carbon atoms, phenyl and —CH[(C=O)OR$^7$]CHR$^8$C(=O) OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms.

Specific silylating agents with isocyanate functional groups include isocyanatosilanes, for example. Specific silylating agents with amino functional groups include aminosilanes, for example. Other specific suitable silylating agents are also described elsewhere herein.

Suitable silylating agents will be apparent to those of ordinary skill in the art. As described herein, the silylating agent best suited for the silylation reaction will depend on the reactive functional groups on the first intermediate product.

In one embodiment, the silylating agent is defined by Formula (5), wherein Y is —N=C=O or —NHR$^6$, where R$^6$ is as defined above, R$^4$ is methylene, ethylene or propylene, R$^5$ is methyl or ethyl and b is 0 or 1, preferable 0.

Other suitable silylating agents include isocyanatosilanes, mercaptosilanes and aminosilanes. For example, the isocyanatosilane can be a selected from 3-isocyanatopropylmethyldimethoxysilane, 3-isocyanatopropyitrimethoxysilane and 3-isocyanatopropyltriethoxysilane. A suitable isocyanatosilane is available from Momentive Performance Materials, Inc. under the designation Silquest® A Link-35 and Silquest® A-Link 25. The aminosilanes can be, for example, selected from 4-amino-3,3-ditnethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane and aminoisopropoxyethyltriethoxysilane.

Other suitable silylating agents include, but are not limited to, the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxyphenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptototyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methyl propylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

The silylating agent is used in an amount ranging from 0.2 to 1.5 molar equivalents based on the prepolymer containing reactive functional groups. The molar ratio of the silylating agent having formula (5) to the prepolymer having reactive functional groups having formula (1) is based upon the molar ratio of the Y function group on the silylating agent to the X functional groups on the prepolymer containing reactive functional groups, where the molar ratio (Y:X) is from about 0.2:1 to about 1.2:1, more specifically from about 0.8:1 to about 1.1:1, even more specifically from about 0.9:1 to about 1:1.

When X group is a hydroxyl group, the molar amount of the hydroxyl content of the prepolymer having reactive functional groups is determined from the hydroxyl number. The hydroxyl number is determined in accordance with ASTM D4274-11, Standard Test Methods for Testing Polyurethane Raw Materials: Determination of Hydroxyl Numbers of Polyols. When the X or Y group is an isocyanate group, the molar amount of the isocyanate content of the prepolymer having reactive functional groups or the silylating agent is determined in accordance with ASTM D2572-97 (2010), Standard Test Method for Isocyanate Groups in Urethane Materials or Prepolymers. When the X or Y group is an amino group, the molar amount of the amine content of the prepolymer having reactive functional groups or the silylating agent is determined in accordance with ASTM D2074-07(2013), Standard Test Methods for Total, Primary, Secondary, and Tertiary Amine Values of Fatty Amines by Alternative Indicator Method.

The reaction of the silylating, agent can be carried out using less than or greater than a stoichiometric amount of the silylating agent. The reaction of the polyisocyanate with the polyols in the chain extension reaction can be incomplete prior to the addition of the silylating agent. In these cases, the prepolymer having reactive functional groups will have X groups which are both hydroxyl groups and isocyanate groups. The Y group of the silylating agent may therefore react with only the hydroxyl X group or isocyanate X group. The reaction product may have residual X functional groups from the prepolymer having reactive functional groups that are not reactive with the Y functional groups from the silylating agent. The second intermediate product may therefore have excess X groups for the prepolymer having reactive functional groups, excess Y groups from the silylating agent and/or excess X groups and excess Y groups. The excess X or Y functional groups can be quenched.

The reaction of the silylating agent and the first intermediate product will produce a silylated polymer composition. In some embodiments, the silylating reaction does not proceed to completion. Accordingly, the silylated polymer composition produced from the silylating reaction contains unreacted reactive groups from the first intermediate product or from the silylating agent.

Preferably, the scavenging agent quenches the unreacted reactive functional groups from the prepolymer having reactive functional groups, the silylating agent or both the silylating agent and prepolymer having reactive functional groups. More preferably, the scavenging agent quenches the unreacted reactive functional groups in the second intermediate product where the reactive groups are isocyanates. In preferred embodiments, the reaction rate between the scavenging agent and the unreacted reactive groups is faster than the reaction rates between the unreacted reactive groups.

Accordingly, in another aspect the continuous process of producing a silylated polymer comprises a silylating, step with backmixing and a quenching step. In one embodiment, the scavenging package is added directly to the endcapping tubular reaction unit or can be mixed with the silylated polymer after removal from the endcapping tubular reaction unit, such as in a downstream quenching unit. In a continuous process, the silylated polymer composition is continuously directed from the endcapping, tubular reaction unit towards a downstream reaction chamber. This reaction chamber is referred to herein as the quenching unit. In one embodiment, the endcapping tubular reaction unit continuously delivers the silylated polymer, as the second intermediate product, to the quenching unit. A scavenging agent is continuously fed into the quenching unit from a scavenging agent reservoir by a feed line. The scavenging agent and the second intermediate product are allowed to continuously mix and react in a quenching reaction. In the quenching reaction unreacted reactive functional groups that remain in the second intermediate product are reacted with the scavenging agent to produce a quenched silylated polymer. This reduces viscosity creep and reduces the deterioration of the mechanical properties of the silylated polymer that would be introduced by post production reaction of the reactive groups in the silylated polymer.

Suitable scavenging agents include isocyanate-reactive scavenging agents possessing at least one active hydrogen. Moreover, the isocyanate-reactive scavenging agent of the present invention is one that reacts with isocyanate at a rate greater than that of the undesired reaction that causes an increase in viscosity. The undesirable reactions include the further reaction of silylating agent containing isocyanate groups with the silylated polymer, as for example reaction of isocyanate with urethane to form allophanate, reaction of isocyanate with urea to form biuret, and reaction of the hydroxyl-terminated polymers with isocyanate-terminated polymers to form a new urethane group and increase the viscosity of the silylated polymer, such as a moisture-curable silylated polymer.

In one embodiment, suitable scavenging agents include cyclic amides such as $C_4$-$C_7$ amides. These $C_4$-$C_7$ amides include, for example, 2-pyrrolidone, ε-caprolactam, or blends thereof. When scavenging agent includes ε-caprolactam, a solvent may be used to solubilize the scavenging agent. For example, the scavenging agent may be part of a scavenging package (used to scavenge isocyanate) which includes a solvent and a ε-caprolactam. In another embodiment the scavenger package is 2-pyrrolidone or 2-pyrrolidone in a solvent. In still another embodiment, the scavenging package includes a solvent, 2-pyrrolidone and ε-caprolactam. Suitable solvents includes ethers, ketones, esters, or vinyltrimethoxysilane.

The isocyanate-reactive scavenging agent or scavenging agent package can be added to the silylated polymer of the endcapping reaction, which may still contain the silylating agent, prepolymer containing reactive functional groups, partially silylated polymer, and optionally other ingredients, such as catalysts and non-protic solvents, at a desired point near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polymer can come from the di- or polyisocyanate used to chain extend the polyol, or from the isocyanatosilane used to react with the prepolymer containing hydroxyl functional groups. The desired point for the addition of the isocyanate-reactive scavenging agent can be determined by the viscosity of the reaction mixture, or by some other method. Thus, the isocyanate-reactive scavenging agent is added to the reaction mixture at a particular viscosity depending on formulation and the desired properties of the final product.

In one embodiment of the present invention, the isocyanate-reactive scavenging agent is added to the second intermediate product at a viscosity range from about 1,000 cP to about 150,000 cP, as measured at a temperature of 25° C., and in another embodiment of the invention from about 30,000 cP to about 75,000 cP, as measured at a temperature of 25° C. In this manner, the isocyanate-reactive scavenging agent minimizes batch-to-batch variation of the final viscosity of the silylated polymer.

The isocyanate-reactive scavenging agent is allowed to react with the isocyanate-containing reaction mixture for sufficient time to ensure that most to all, preferably all, of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted. In one embodiment of the invention, the amount of isocyanate-reactive scavenging agent added to the second intermediate product is from about 0.01 to about 5 weight percent based upon the total weight of the second intermediate product, from about 0.01 to about 0.5 weight percent based upon the total weight of the second intermediate product of the process in another embodiment of the invention, and in still another embodiment from about 0.02 to about 0.2 weight percent based upon the upon the total weight of the second intermediate product of the process.

According to one embodiment of the invention, the total weight of the second intermediate product of the process and the isocyanate-reactive scavenging agent has a reduced isocyanate content of less than about 0.1 weight percent isocyanate (measured as % NCO), and in another embodiment of the invention the total weight of the second intermediate product of the process and the isocyanate-reactive scavenging agent has a reduced isocyanate content of less than about 0.02 weight percent isocyanate (measured as % NCO).

The isocyanate-reactive scavenging agent can be added neat, or as a mixture with other materials. The disappearance of the isocyanate can be determined directly by analytical techniques such as infra-red spectroscopy and titration, or indirectly by the measurement of constant viscosity of the reaction mixture. The synthesis can be monitored using titration, or infrared analysis. For example, silylation of the prepolymer containing reactive functional groups, in which the functional groups are isocyanate is considered complete when no residual —N═C═O can be detected by either technique. A preferred method for determining the residual —N═C═O is ASTM D2572-97 (2010), Standard Test Method for Isocyanate Groups in Urethane Materials or Prepolymers.

According to one embodiment of the invention, the isocyanate-reactive scavenging agent is a mono-alcohol or a mixture of different mono-alcohols.

Mono-alcohols are used because they have low odor, do not contribute to the color of the silylated polymer and inhibit the reaction of silylated polymer having residual hydroxyl groups or prepolymers having reactive functional groups, such as hydroxyl groups, with the alkoxysilyl group. Other active hydrogen compounds, such as amines and organic acids, have strong odor, can form color and can catalyze the reaction of the silylated polymer having residual hydroxyl group or prepolymer having reactive functional groups, such as hydroxyl groups, with alkoxysilyl group.

The monoalkanol isocyanate-reactive scavenging agent possesses the general Formula (9):

$$R^{15}\text{—OH} \tag{9}$$

wherein $R^{15}$ is a monovalent hydrocarbon radical containing from about 1 to about 30 carbon atoms and optionally may contain a heteroatom, more specifically from about 1 to about 5 and even more specifically methyl or ethyl. The heteroatom can, for example, be oxygen, which can form organofunctional groups, such as ethers, ester, and ketone groups. In another embodiment, the hydrocarbon radical is selected from the group consisting of linear, branched and cycloalkyl, and alkenyl, aryl, arenyl and aralkyl.

Representative non-limiting examples include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethyl phenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —CH$_2$OH. The mono-alcohol scavenging agents of the present invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof.

In a specific embodiment of the invention, when the terminal alkoxysilyl group of the silylated polymer is a methoxysilyl the specific isocyanate-reactive scavenging agent is methanol. In another specific embodiment of the invention, when the terminal alkoxysilyl group of the silylated polymer is an ethoxysilyl, the specific isocyanate-reactive scavenging agent is ethanol.

While suitable quenching units for carrying out the quenching reaction will be readily apparent to those of ordinary skill in the art, it is contemplated herein that the extension unit is, for example, a tubular reactor with an upstream inlet and a downstream outlet as described herein or a continuous stirred reactor with an inlet and an outlet. In one embodiment, the second intermediate product is delivered or fed into the quenching unit by a delivery means such as by hand or by automation or by an outlet of an upstream endcapping tubular reaction unit. The scavenging agent or scavenging agent package is likewise delivered or fed to the quenching unit by a delivery means such as by hand or by automation or by an outlet of an upstream endcapping tubular reaction unit or from an upstream reservoir. The second intermediate product and scavenging agent or scavenging agent package may be fed into the quenching unit simultaneously or alternatively, though it is preferred that they are simultaneously fed into the quenching unit. The second intermediate product and the scavenging agent or scavenging agent package are allowed to mix and react in the quenching unit to produce the quenched silylated polymer.

A silylated polymer composition produced by the silylation reaction or the quenched silylated polymer composition contains a silylated polymer. In one embodiment, the silylated polymer is a moisture-curable silylated polymer.

For example, in one embodiment, the silylated polymer is moisture-curable silylated polyurethane polymer.

In one embodiment of the invention, mixture of the second intermediate product with the scavenging agent or scavenging agent package results in a silylated polymer composition with a reduced content of unreacted reactive functional groups. For example, in one specific embodiment the mixture of the second intermediate product containing the silylated polymer with the scavenging package reduces the amount of isocyanate groups. The amount of isocyanate groups can be determined by known methods such as by titration. Moreover, the reduction in isocyanate groups is also indicated by the composition having specifically a viscosity of about 1,000 cP to about 150,000 cP, more specifically from about 30,000 cP to about 75,000 cP and most specifically from about 35,000 cP to about 65,000 cP, where the viscosity is determined at 25° C.

The quenched silylated polymer can be removed from the quenching unit following quenching. In one embodiment the quenched silylated polymer is a quenched moisture-curable silylated polymer, such as a quenched moisture-curable silylated polyurethane polymer, for example. In one embodiment, the quenched moisture-curable silylated polymer has the general Formula (10):

$$X^1_g\text{—}(R^1)[\text{-}A^1C(\!\!=\!\!O)A^2R^4Si(CH_3)_b(OR^5)_{3-b}]_{a-g} \quad (10)$$

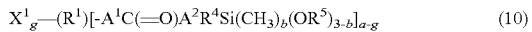

wherein
each occurrence of $X^1$ is a functional group selected from the group consisting of

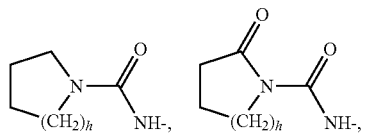

—NHC(=O)OR$^{15}$, —NHC(=O)NR$^{16}$R$^{17}$, CH$_2$=CH— and —OH, wherein each occurrence of R$^{15}$ is a monovalent hydrocarbon radical containing from about 1 to about 30 carbon atoms and optionally may contain a heteroatom, preferably an alkyl group of from 1 to about 6 carbon atoms or phenyl, each occurrence of R$^{16}$ is hydrogen, an alkyl group of from 1 to 6 carbon atoms or phenyl, each occurrence of R$^{17}$ is hydrogen, an alkyl group of from 1 to about 6 carbon atoms or phenyl and the subscript h is an integer of from 1 to about 6, preferably 1 or 2;

each occurrence of A$^1$ is a functional group selected from the group consisting of —O—, —S— and —NH—;

each occurrence of A$^2$ is a functional group selected from the group consisting of —S—, —NR$^6$, where R$^6$ is selected from the group consisting of hydrogen, an alkyl group containing 1 to about 10 carbon atoms, cycloalkyl group containing from about 5 to about 10 carbon atoms, an aralkyl group containing from about 7 to about 10 carbon atoms, phenyl and —CH[(C=O)OR$^7$]CHR$^8$C(=O)OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from 7 to 10 carbon atoms;

R$^1$ is an organic group containing from about 50 to about 4,000 carbon atoms and at least one functional group selected from group consisting of —O—, —S—, —OC(=O)NH—, —R$^2$NC(=O)NH—, —C(=O)O—, —OC(=O)O—, —OCHR$^2$O—, —C(=O)NR$^2$— and —NR$^2$—, wherein each occurrence of R$^2$ is independently hydrogen, an alkyl group containing from 1 to about 6 carbon atoms or phenyl, preferably hydrogen;

R$^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of R$^5$ is an alkyl group of from 1 to about 18 carbon atoms or a —R$^9$(OR$^{10}$)$_c$OR$^{11}$, where R$^9$ is an alkyl group of from 1 to about 18 carbon atoms, R$^{10}$ is a divalent alkylene group of from about 2 to about 4 carbon atoms, and R$^{11}$ is an alkyl group of from about 1 to about 10 carbon atoms or —C(=O)R$^{12}$, where R$^{12}$ is hydrogen, or an alkyl group of from 1 to about 6 carbon atoms, and the subscripts a, b, c and h are integers where a is 1 to about 5, b is 0 to about 2, c is 0 to about 5 and g is 0 or 1, with the provisos that (i) a-g is greater than or equal to 1, and (ii) when A$^1$ is —O— or —S—, then A$^2$ is —NH—.

In another aspect of the disclosed continuous process, the continuous process includes a silylating step with backmixing of at least a portion of the second intermediate product, stabilization of the prepolymer having reactive functional groups and quenching of the second intermediate product as described in the previous embodiments. The combined steps of backmixing, stabilizing and quenching provides for a quenched silylated polymer of low color, as indicated by a color of less than 50 Pt—Co, preferable less than 10 Pt—Co, with less than about 0.02 weight percent isocyanate (measured as % NCO) and free of viscosity creep.

In one embodiment the continuous process of producing a silylated polymer comprises a silylating step. The silylating step comprises reacting a stabilized prepolymer having reactive functional groups, as a first intermediate product, with a silylating agent to produce a silylated polymer, as a second intermediate product. The silylating step also includes a step of backmixing, by a backmixing loop, at least a portion of the second intermediate product. The process also includes a quenching step where a scavenging package is introduced into the second intermediate product to quench unreacted reactive functional groups still remaining in the second intermediate product. The scavenging agent reacts with the unreacted reactive functional groups to prevent their subsequent reaction and thereby preventing viscosity creep.

In one embodiment, the stabilizer package is added to an early stage of the process. For example, in one embodiment, the stabilizing package is mixed with the prepolymer having reactive functional groups before the prepolymer is reacted with the chain extension agent or before it is reacted with the silylating agent or before the second intermediate product is quenched. In a preferred embodiment, the stabilizing package is added to the prepolymer having reactive functional groups and mixed in a mixing chamber before preheating. The stabilized prepolymer having reactive functional groups is then subsequently delivered to an extension unit or an endcapping tubular reaction unit.

While the stabilizer package may include various components, in preferred embodiments the stabilizer package comprises a phosphite. Suitable phosphites include triisodecyl phosphite, for example. It is also contemplated within this disclosure that the stabilizer package also includes other components such as hindered phenol antioxidants, for example. In one embodiment, the hindered phenol is preferably IRGANOX 1135, for example. In a specific embodiment the stabilizer package includes triisodecyl phosphite and IRGANOX 1135. Triisodecyl phosphite is available from Dover Chemicals as DOVERPHOS 6™. IRGANOX 1135™ is available from BASF.

It has been surprisingly found that by including a phosphite in the stabilizer package used to stabilize the prepolymer containing reactive functional groups and before the chain extension reaction, discoloration of the silylated polymer as made and over time is reduced, even when the silylated polymer is made at a high process temperatures, as for example, greater than about 85° C., more specifically greater than 125° C. and most specifically, from about 85° C. to 180° C.

Accordingly, in some embodiments the first intermediate product is a stabilized prepolymer with reactive functional groups, preferably terminal reactive functional groups. For example, in one embodiment, the first intermediate product is a stabilized polyol with terminal hydroxyl groups, a stabilized chain extended polyol with terminal hydroxyl groups, a stabilized polyurethane with terminal isocyanate groups, or a stabilized chain extended polyol with both isocyanate and hydroxyl groups.

As noted, the first intermediate product is delivered to the endcapping unit for mixing and reaction with the silylating agent to produce the second intermediate product.

In one embodiment, the silylated polymer produced by the disclosed process is a moisture-curable silylated polyurethane polymer. While this embodiment is described herein to provide an example of the silylated polymer produced by the process, it is not intended as a limiting example.

In one embodiment of the continuous process for preparing a moisture-curable silylated polyurethane polymer with backmixing, an endcapping reaction is provided in an endcapping tubular reaction unit with an upstream inlet and a downstream outlet. The reactants are mixed, heated, reacted or any combination thereof, to provide a second intermediate product. The reactants here include a first intermediate product that is directed into the inlet of the endcapping tubular reaction unit from an upstream chain extension unit used for a chain extension reaction while a silylating agent is fed into the endcapping unit from a silylating agent reservoir by a feed stream. The first intermediate product is a prepolymer having reactive functional groups, and is a chain extended polyol with hydroxyl terminal groups. The silylating agent is an isocyanatosilane. Suitable isocyanatosilanes are described herein. The second intermediate product is directed towards a downstream quenching unit. A portion of the second intermediate product is backmixed as described herein. In preferred embodiments, the backmixed portion of the second intermediate product contains a partially silylated polyurethane.

In another embodiment of the continuous process for preparing a moisture-curable silylated polyurethane polymer with backmixing, the first intermediate product is a chain extended polyol with isocyanate terminal groups. The silylating agent is an aminosilane. Suitable aminosilanes are described herein. A portion of the second intermediate product is directed towards a downstream quenching unit. A portion of the second intermediate product is backmixed as described herein.

In another embodiment of the continuous process for preparing a moisture-curable silylated polyurethane polymer with backmixing, the first intermediate product is a polyol with terminal hydroxyl groups. The silylating agent is an isocyanatosilane. Suitable isocyanatosilanes are described herein. A portion of the second intermediate product is directed towards a downstream quenching unit. A portion of the second intermediate product is backmixed as described herein.

In a specific embodiment, the continuous process comprises (I) a silylating step with backmixing which comprises:
(a) continuously adding a prepolymer containing reactive functional groups, which is a chain extended polyol having terminal hydroxyl groups, as a first intermediate product, to an endcapping unit;
(b) continuously adding a silylating agent, which is an isocyanatosilane, into the endcapping unit of step (a);
(c) allowing the prepolymer containing reactive functional groups and the isocyanatosilane to mix and react to form a moisture-curable silylated polyurethane polymer, as a second intermediate product;
(d) continuously backmixing at least a portion of the second intermediate product to an upstream endcapping reaction unit or feed stream where backmixing adjusts at least one upstream property such as ratio of reactants, ratio of products, ratio of reactants to products, process temperature, residence time of reactive functional groups, flow rates, reaction rates and other reaction kinetics; the backmixing comprises (i) continuously removing a portion of the second intermediate product of step (c) from the endcapping unit; (ii) continuously mixing the removed portion of the second intermediate product with additional silylating agent to form a mixture comprising the second intermediate product and silylating agent; and (iii) continuously adding the mixture of step (ii) to the endcapping unit to form a mixture comprising silylating agent, second intermediate product and prepolymer containing reactive functional groups from step (a);
(e) continuously reacting the mixture of step (iii) to provide a moisture-curable silylated polyurethane polymer; and (II) further optionally comprises an upstream stabilization reaction as described herein; an upstream chain extension reaction as described herein; a downstream quenching reaction as described herein; or any combination thereof.

Although described herein as optional, in preferred embodiments of the continuous process, the upstream and downstream reactions and reaction units are present and are connected together to form a continuous unit containing a chain extension unit, an endcapping tubular reaction unit, and a quenching unit.

As noted, it is also contemplated as part of this disclosure that specific examples of the first intermediate product used in the preparation of the moisture-curable silylated polyurethane polymer can be a polyol with terminal isocyanate groups, a chain extended polyol with terminal isocyanate groups or a chain extended polyol with both hydroxyl and isocyanate groups. Similarly, it is also contemplated that the silylating agent can be an aminosilane or a silane with a thiol or hydroxyl functional group.

The continuous process includes optional reaction units upstream and downstream of the endcapping tubular reaction unit. For example, optional upstream reaction units include a mixing chamber upstream of a heat exchanger, which is upstream of a premixer of a chain extension unit, which is upstream of a chain extension unit, which is upstream of a premixer of the endcapping unit, which is upstream of the endcapping unit. Optional units downstream of the endcapping unit include, a premixer of a quenching unit, which is upstream the quenching unit, which is upstream of at least one cooling unit, which is upstream of at least one analysis unit, which is upstream of a storage unit.

When present, the reaction units are connected such that a reaction product from one reaction unit can be transferred to another reaction unit as a reactant. Feed streams feed reactants into the various reaction units at inlets of the reaction units or at some intermediate location between the inlet of the reaction unit and the outlet of the reaction unit. Feed streams form a connection between optionally provided reactant reservoirs and the reaction units. The reactants in a reaction unit are heated, mixed, provided time for reaction, or any combination thereof in the reaction units such that a product is produced and directed to an outlet of the reaction unit.

Although the reaction units and reactant reservoirs are described as optional in the above paragraph, in preferred embodiments at least one of the optional reactions units is present and at least one of the reactant reservoirs is present. In another embodiment, at least one reaction unit is upstream of the endcapping tubular reaction unit and at least one reaction unit is downstream of the endcapping tubular reaction unit.

In one embodiment, the polyol is directed into the endcapping tubular reaction unit without reacting with a chain extension agent. The polyol then functions as the first intermediate product and is reacted with a silylating agent to produce the moisture-curable silylated polyurethane polymer.

In one specific embodiment, the moisture-curable silylated polymer prepared by the process described above of the invention is a moisture-curable silylated polyurethane polymer. The continuous process comprises reacting a silylating agent with a prepolymer containing reactive functional groups, where the prepolymer containing the reactive functional groups is a polyurethane, to generate a second intermediate product, and a portion of the second intermediate product is backmixed with additional silylating agent to form mixture, which is added to the endcapping tubular reaction unit to produce the moisture-curable silylated polyurethane polymer.

Additional components are also contemplated for addition to the continuous process for preparing silylated polymer with backmixing. Suitable additional components are described herein. For example, the additional component includes at least one of catalysts, plasticizers, colorants, stabilizers, antioxidants, thixotropes, fillers and the like. The additional components may be added during the continuous process or at the end before or after incorporation into adhesives, coatings and the like. For example, in one embodiment stabilizers, catalysts or blends thereof are included in the continuous process.

In one embodiment, a stabilizer is added into an early stage of the process. For example, the stabilizer is mixed with the polyol upstream of any chain extension or any endcapping reaction. It is contemplated herein that the stabilizer is mixed with the polyol in an upstream mixing chamber. Suitable stabilizers are disclosed herein.

Where the process includes additional components, the additional components may be added in different steps along the continuous process. For example, in one embodiment one stabilizer is added in the mixing chamber, while another is added in a premixer of the chain extension unit. Catalysts, plasticizers, colorants, stabilizers, antioxidants, thixotropes, fillers and the like may also be individually added or blended into the same or separate stage of the process. It is also contemplated herein that the additional components, such as multiple stabilizers, are blended and added into the various reaction units, upstream or downstream of the endcapping unit, or in the endcapping unit.

In one embodiment, the process for preparing a silylated polymer includes incorporating additional components such as catalysts, plasticizers, colorants, stabilizers, thixotropes, fillers and the like. Exemplary plasticizers include phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The plasticizer typically comprises from about 1 to about 100 parts per hundred parts of the moisture-curable silylated polymer with about 40 to about 80 parts per hundred being preferred.

Exemplary fillers include, but are not limited to, reinforcing fillers such as fumed silica, precipitated silica, clay, alumina, aluminosilicates and calcium carbonates. To further improve the physical strength of the formulations, reinforcing carbon black can be used as a main filler, leading to black systems. Several commercial grades of carbon black useful in this invention are available, such as "Corax" products (Evonik Industries). To obtain translucent formulations, higher levels of fumed silica or precipitated silica should be used as the main filler, without carbon black.

Treated calcium carbonates having particle sizes from about 0.07 microns to about 4 microns are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to about 300 parts per 100 parts of the silylated polymer with about 80 to about 150 parts being the more preferred loading level.

Catalysts are generally added to increase reaction rates between the polyol and the chain extension agent to produce the first intermediate product. For example, in one embodiment the catalyst is added to increase the reaction between the polyol and the polyisocyanate to produce a first intermediate product of polyurethane prepolymer having terminal reactive groups that are either hydroxyl or isocyanate. Some suitable catalysts are compounds containing titanium, bismuth or zinc, dialkyltin dicarboxylates, such as dibutyltin dilaurate and dibutyltin acetate, tertiary amines, the stannous salts of carboxylic acids, such as stannous octoate and stannous acetate, and the like.

Catalysts typically used in the preparation of the first intermediate product can also be used to catalyze the reaction of the first intermediate product with a silylating agent. Suitable catalysts include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts used for making the first or second intermediate product are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2{++}$ $UO_2{++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to about 18 carbon atoms, and reaction products of alcoholates of various metals with carboxylic acids, beta-diketones, and 2-(N,N-dialkylamino)alkanols, such as well-known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin di acetate, dibutyltin dilaurate, dibutyltin maleate, dilauryltin diacetate, dioctyltin diacetate, dibutyltin-bis(t-methylaminobenzoate), dibutyltin dilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof. For example, in one embodiment, a first intermediate product of polyurethane prepolymer having terminal reactive groups that are hydroxyl is reacted with an isocyanatosilane in the presence of a catalyst such as Sn metal catalyst to form the second intermediate product, which is of a silylated polyurethane composition.

In one embodiment, the amount of catalyst is from about 0.001 to about 5 weight percent, more specifically from about 0.001 to about 2 weight percent and even more specifically, from about 0.005 to about 1 weight percent, and even more preferably 0.005 to about 0.1 weight percent, based on the weight of the prepolymer containing reactive functional groups. In one embodiment, the catalyst is about 20 ppm Sn or about 120 ppm of catalyst compound (DBTDL) relative to the polyol; a weight percent of about 0.012%.

Stabilizing agents and antioxidants are also contemplated as additional components, which may be added to the process. UV stabilizers and/or antioxidants can be incorporated into the sealant or adhesive formulations of this invention in an amount from about 0.0001 to about 5 parts per hundred parts of moisture-curable silylated polymer with about 0.5 to about 2 parts being preferred. Although the stabilizing agents can be incorporated into the sealants or adhesives, it is also contemplated that the stabilizing agents are added to at least one of the steps of the production process of the silylated polymer.

In one particular embodiment, a moisture-curable silylated polyurethane polymer is produced by the continuous process with backmixing and stabilizing steps. The stabilizer package comprises sterically hindered phenols and phosphite stabilizers.

In one embodiment, an analysis unit is an in-sequence (online) measurement tool (e.g., a viscometer, an infrared spectrometer, a refractive index instrument, colorimeter) to determine parameters, such as viscosity, residual isocyanate, refractive index of the second intermediate product. In one embodiment, the second intermediate product is alternatively or additionally directed into another unit to make a compounded product such as sealants, adhesives, or coatings.

Another aspect of the invention is a system for the continuous production of the silylated polymer. In one embodiment, the system comprises n silylation unit having a tubular reactor with an upstream inlet and a downstream outlet; and a backmixing loop providing fluid communication from the downstream outlet to the upstream inlet. By the backmixing loop at least a first portion of a silylated polymer composition, prepared in the silylation unit, can be backmixed upstream to adjust process parameters in particular process chambers without affecting other process chambers. In one embodiment, the backmixing loop includes at least one of a pump, a heat exchanger, a jacketed static mixer, or a variable diameter endcapping unit. In one embodiment, the system further comprises at least one upstream process chamber, as described herein, that is in fluid communication with the inlet of the silylation unit and at least one downstream process chamber in fluid communication with the outlet of the silylation unit. For example, the at least one upstream process chamber is at least one of a chain extension unit and the at least one downstream process chamber is a quenching unit. Other upstream and downstream reactors, reservoirs and feed streams, as described herein, form part of the continuous process such that they are in fluid communication with each other.

The invention will be further understood through the description of the figures which represent some specific embodiments of the continuous process of producing a silylated polymer with a backmixing step.

In a continuous process, the backmixing loop (33) continuously backmixes a portion of the second intermediate product until a predetermined degree of completeness of the reaction is reached. Means of determining the degree of the reaction's completeness will be apparent to those of ordinary skill in the art. For example, titration is a suitable means.

FIG. 1 depicts one embodiment of the continuous process for making a silylated polymer. The process comprises a silylating step with backmixing. The silylating step with backmixing comprises an endcapping reaction in a tubular reactor (30) referred to herein as the silylation unit (30). A silylating agent and a prepolymer having reactive functional groups are reacted in the silylation unit (30) to form a silylated polymer composition, as a second intermediate product. At least a portion of the produced silylated polymer composition is removed from a downstream outlet of the silylation unit (30) and delivered by a backmixing loop (33) to an upstream mixer (21). A feed line (62) delivers fresh stream of silylating agent from reservoir (60b) into the mixer (21). The backmixed portion of the silylated polymer composition is mixed with the silylating, agent in the mixer and is then directed into the silylation unit (30). While a portion of the silylation polymer composition is continuously backmixed, at least another portion is continuously directed downstream towards other process chambers. The backmixing loop (33) includes a pump (34) for directing the backmixed portion of the silylated polymer composition upstream. The prepolymer is directed to the silylation unit (30) from an upstream reservoir (10). In this embodiment, the prepolymer is pumped from reservoir (10) by a pump (11) into a mixer (70) where it is mixed with catalyst delivered by feed line (61) from reservoir (60a). The mixed catalyst and prepolymer are then directed into a heat exchanger (80) where the temperature of the mix is adjusted to a predetermined temperature and then directed into a second mixer (21) where it is mixed with silylation agent and optionally a portion of the backmixed silylated polymer composition. The portion of the silylated polymer composition that is directed downstream of the silylation unit (30) is directed into a heat exchanger (51) where the temperature is adjusted to a predetermined temperature and then directed downstream into a storage container (90). The silylated polymer can be removed by known methods of isolating polymer from a silylated polymer composition.

The backmixing loop may be equipped with various process chambers which can independently adjust various parameters of the backmixed portion of the silylated polymer composition. For example, while the backmixing loop (33) in FIG. 1 includes a pump (34), FIG. 2 also includes a heat exchanger (35) which adjusts the temperature of the backmixed portion of the silylated polymer composition without affecting the continuous flow of material through the other process chambers. The process chambers along the backmixing loop (33) may be arranged in parallel, in sequence or both. However, in preferred embodiments these process chambers are arranged in sequence.

FIG. 3 depicts an embodiment where the backmixing loop (33) includes a pump (34) and a mixer (35) in sequence. The backmixed portion of the silylated polymer composition is mixed with fish silylating agent in mixing chamber (35) before it is directed into a pump (34) which then directs the mixture into an inlet of the silylation unit (30) for further continuous processing.

In one embodiment, as depicted in FIG. 4, the process comprises a silylation step with backmixing. The silylation step with backmixing includes a silylation reaction where the reaction occurs in a tubular reactor having a reactor chamber (30) coupled to a variable diameter reactor chamber (31). The backmixing loop (33) includes a mixer (35) and a pump (34). The backmixed portion of the silylated polymer composition is mixed with fresh silylating agent in the mixer (35) before it is directed to the pump (34) which directs it into an inlet of the silylation unit (30).

In one embodiment, as depicted in FIG. 5, the process comprises a silylation step with backmixing and a downstream quenching step. The backmixing loop (33) comprises a pump (34) and removes at least a portion of the silylated polymer composition from an outlet of the silylation unit (30) and delivers it upstream to an inlet of the silylation unit. At least another portion of the silylated polymer composition is directed downstream from the silylation unit (30) towards a tubular quenching unit (40), where the silylated polymer composition is quenched in a quenching step. In the quenching step a scavenging package, which includes at least one scavenging agent, is directed into the quenching unit from a reservoir (60c). The scavenging package is mixed with the silylated polymer composition and allowed to react until the amount of unreacted reactive functional groups in the composition reaches a predetermined level. After quenching, the silylated polymer composition is directed downstream towards a cooling unit (90). The silylated polymer is obtained from the silylated polymer composition by known isolation methods.

In one embodiment, as depicted in FIG. 6, the process comprises a silylation step with backmixing and a stabilization step upstream of the silylation step with backmixing. The process also includes a chain extension step comprising a chain extension reaction where a polyol is reacted with a chain extension agent to provide a chain extended polymer having terminal reactive functional groups. In the stabilization step, a first feed line (61) delivers a stream of a catalyst, from reservoir (60a), and a stabilization agent, from reservoir (60a), into a first mixer (70) where they are mixed with the polyol. This mixture is directed into a downstream heat exchanger (80), which adjusts the temperature of the mixture and directs the polyol downstream into a tubular chain extension reactor unit (20). A chain extension agent, polyisocyanate, is also directed into this chain extension unit (20) where it reacts with the polyol to produce a chain extended polymer. This polymer comprises terminal reactive functional groups. The stabilization step results in a finally produced silylated polymer with reduced discoloration and intermediate products along the process with reduced discoloration. The discoloration is also reduced as the silylated polymer ages over time.

In one embodiment, as depicted in FIG. 7, the process comprises a stabilization step upstream of a chain extension step, which is upstream of a silylation step with backmixing, which is upstream of a quenching step. Each step is as described above in FIGS. 4 to 6.

The process is continuous and all process steps, as described in each FIGS. 1 to 7, are in continuous sequence relative to the other process steps.

The following non-limiting examples further describe and disclose the invention.

EXAMPLES

Example 1 and Comparative Example I

Preparation of the Scavenging Package for Quenching the Moisture-Curable Silylated Polyurethane Polymer The scavenging package was a pre-melted quench solution made of 0.5 gram of ε-caprolactam (obtained from SigmaAldrich) and 3.3 gram of vinyltrimethoxysilane (obtained from Momentive Performance Materials, Inc. under the tradename, Silquest® A-171 silane). The mixture was melted on a heat/magnetic stir plate. ε-Caprolactam is a solid at room temperature and is not easily incorporated into the continuous unit. Effort was made to make the pre-melted quench solution of 0.5 gram of ε-caprolactam from Sigma Aldrich and 3.3 gram of vinyl trimethoxysilane. The mixture was melted on a heat/magnetic stir plate. However, even after melting and dissolving in the vinyltrimethoxysilane, the ε-caprolactam quickly precipitated out again at room temperature. A novel approach to overcome this issue was by adding the melted ε-caprolactam into a blend of 2-pyrrolidone and vinyltrimethoxysilane. 2-Pyrrolidone, ε-caprolactam and vinyltrimethoxysilane formed a quench solution that was stable at room temperature or even low temperatures (relevance to manufacturing environment during winter time). This approach offers a good balance of kinetics of quenching, and miscibility. The reaction rate of the quenching reaction of NCO groups with 2-pyrrolidone is slower than the reaction rate of the NCO groups with ε-caprolactam. The stability of the mixture is illustrated in Table 1. Comparative Example I is vinyltrimethoxysilane.

TABLE 1

Evaluate the stability of quenching solution at different ratio of ε-caprolactam and 2-pyrrolidone in vinyltrimethoxysilane

| | Silquest A-171 silane, grams | ε-caprolactam, grams | 2-pyrrolidone, grams | PPT @ 23° C. in 1 day | PPT @ < 0° C. in 5 hr (out door in February) |
|---|---|---|---|---|---|
| Mixture 1.1 | 16.4 | 3.6 | 1 | no | no |
| Mixture 1.2 | 16.4 | 3.6 | 0.8 | no | no |
| Mixture 1.3 | 16.4 | 3.6 | 0.4 | no | no |
| Mixture 1.4 | 16.4 | 3.6 | 0.3 | no | yes |
| Mixture 1.5 | 16.4 | 3.6 | 0 | PPT in 2 hr | yes |

*2-Pyrrolidone was obtained from SigmaAldrich.
** PPT—precipitation

Example 2

The Preparation of a Moisture-Curable Silylated Polyurethane Polymer in a Reaction System Equipped with Backmixing In Example 2, the continuous process for moisture-curable silylated polyurethane polymer was prepared with backmixing using reactor sequence described in FIG. 7 and with the temperatures for the chain extension and silylating reaction presented in Table 2. The poly(propylene oxide) diol (polyol obtained from Zhejiang Huangma Chemical with the trade name HMBT-120, hydroxyl number of 9.90, number average molecular weight of 11,300 grams/mole) was pumped from reservoir (10) into a feed line and transported to mixer (70) at a rate of 756.7 grams per minute. The dibutyltin dilaurate catalyst (Fomrez SUL-4, obtained from Momentive Performance Materials, Inc.), hindered phenol (Irganox 1135 obtained from BASF) and triisodecyl phosphite (Doverphos 6 obtained from Dover Chemical) were added to mixer (70) at a rate of 0.082 gram/minute, 3.783 grams/minute and 3.783 grams/minute, respectively, where these ingredients were transported as a catalyst and stabilizer mixture stored in reservoir (60a) through feed line (61). The polyol, catalyst and stabilizers were mixed and then transported from the mixer (70) to a heat exchanger (80) to heat the mixture of polyol, catalyst and stabilizers to the chain extension temperature. The heated mixture of polyol, catalyst and stabilizers was transported to a second mixer (21) were isophorone diisocyanate (Desmodur I obtained from Bayer) was pumped from reservoir (60b) and was added at a rate of 5.71 grams/minute to the second mixer (21) by means of a feedline (62) and mixed. The mixture of polyol, catalyst, stabilizers and diisocyanate was transported to a chain extension reaction unit (20), a tubular reaction unit with static mixer, and reacted for about 25 minutes. The chain extension reaction product was transported to a third mixer (31) and 3-isocyanatopropyltrimethoxysilane (Silquest* A-Link 35 obtained from Momentive Performance Materials, Inc.) was pumped from reservoir (60c) to the mixer (31) by means of a feed line (63) at a rate of 16.94 grams/minute and then transported to a silylation reaction unit (30) equipped with backmixing loop (33) and pump (34). The backmixing ratio was 0.5 and the average reaction time was 7 minutes. The silylation reaction product was transported from silylation reaction unit (30) to a fourth mixer where scavenging package 1.1 from Table 1 was added at a rate of 19.93 grams/mole and mixed. The mixture containing the scavenging package was transported to a quenching reaction unit (40), a tubular reaction unit equipped with static mixers, and reacted for about 4 minutes. The second reaction product was then removed from the quenching reaction unit (40) and transported to the outlet where it was cooled and the viscosity measured. The samples were cured and the physical properties measured. The data are presented in Table 2.

Examples 3-6

The Preparation of a Moisture-Curable Silylated Polyurethane Polymer in a Reaction System Equipped with Backmixing Examples 3-6 were prepared in accordance with Example 2. The data are presented in Table 2.

Comparative Examples II-VII

Comparative Examples II-VII were prepared in accordance with Example 2, except that the silylated polymer in silylation reaction unit (30) was not backmixed (the backmixing loop and pump were not employed.

TABLE 2

The reaction parameters and effects of backmixing on the properties of moisture-curable silylated polyurethane polymer.

| | | Continuous process | | Properties of Moisture-curable silylated polyurethane polymer | | | | |
| --- | --- | --- | --- | --- | --- | --- | --- | --- |
| | | Reaction | | | | | | |
| Example | Back mix | Reaction temperature, chain extension, °C. | Reaction temperature silylation, °C. | Viscosity @ 25° C., cP | Hardness, Shore A | Tensile Strength, psi | Modulus at 100% elongation psi | Elongation, % |
| 2 | yes | 151 | 142 | 50900 | 22 | 91 | 61 | 200 |
| 3 | yes | 151 | 142 | 46300 | 23 | 98 | 65 | 193 |
| 4 | yes | 150 | 141 | 52400 | 21 | 92 | 56 | 215 |
| 5 | yes | 150 | 145 | 53600 | 20 | 83 | 56 | 190 |
| 6 | yes | 153 | 143 | 48100 | 21 | 101 | 63 | 207 |
| Comparative II | no | 152 | 143 | 52300 | 35 | 53 | 44 | 136 |
| Comparative III | no | 150 | 141 | 42500 | 16 | 48 | 49 | 101 |
| Comparative IV | no | 150 | 122 | 45145 | 11 | 46 | 32 | 383 |
| Comparative V | no | 147 | 120 | 55464 | 33 | 35 | 26 | 157 |
| Comparative VI | no | 150 | 139 | 48542 | 9 | 35 | 26 | 157 |
| Comparative VII | no | 150 | 140 | 47130 | 9 | 39 | 26 | 186 |

Table 2 provides reaction conditions and properties of the moisture-curable silylated polyurethane polymer before and after curing for the process used with and without backmixing. All moisture-curable silylated polyurethane polymers made have similar viscosities. However, the material made with backmixing provides moisture-curable silylated polyurethane polymer with a more consistent hardness and other mechanical properties.

In a close-coupled continuous process with multiple sequential reactions it is desirable to adjust residence time for a reaction without affecting residence time for the other reactions or changing production rate. A back mixing loop process provides a novel way to adjust residence time, or temperature, for a single reactor without affecting the other units. These control features provide desirable product properties.

Examples 7-9

The Effect of Scavenging Package on Continuous Process and Moisture-Curable Silylated Polyurethane Polymer

Example 7

Moisture-curable silylated polyurethane was prepared in accordance with Example 2, except that the scavenging package was a pre-blended mixture of 0.44 weight percent ε-caprolactam, 0.12 weight percent 2-pyrrolidone and 2 weight percent vinyltrimethoxysilane, based on the total weight of the moisture-curable silylated polyurethane polymer and scavenging package, and was injected after the silylation reaction unit (30), endcapping tubular reaction unit, and before the quenching unit (40), as shown in the FIG. 7. The isocyanate concentration (NCO) is monitored at the end of the reaction by titration.

Example 8

Moisture-curable silylated polyurethane was prepared in accordance with Example 2, except that the scavenging package was a pre-blended mixture of 0.12 weight percent 2-pyrrolidone and 2 weight percent vinyltrimethoxysilane, based on the total weight of the moisture-curable silylated polyurethane polymer and scavenging package, and was injected after the silylation reaction unit (30), endcapping tubular reaction unit, and before the quenching unit (40), as shown in the FIG. 7. The isocyanate concentration (NCO) is monitored at the end of the reaction by titration.

Example 9

Moisture-curable silylated polyurethane was prepared in accordance with Example 2, except that the scavenging package was a pre-blended mixture of 0.18 weight percent 2-pyrrolidone and 2 weight percent vinyltrimethoxysilane, based on the total weight of the moisture-curable silylated polyurethane polymer and scavenging package, and was injected after the silylation reaction unit (30), endcapping tubular reaction unit, and before the quenching unit (40), as shown in the FIG. 7. The isocyanate concentration (NCO) is monitored at the end of the reaction by titration.

Comparative Examples VII-X

Comparing Inventive Scavenging Package to Comparative Conventional Scavenger

Comparative Example VII. Moisture-curable silylated polyurethane was prepared in accordance with Example 2, except that the scavenging package contained only 2 weight percent vinyltrimethoxysilane, based on the total weight of the moisture-curable silylated polyurethane polymer and scavenging package, and was injected after the silylation reaction unit (30), endcapping tubular reaction unit, and before the quenching unit (40), as shown in the FIG. 7. The isocyanate concentration (NCO) is monitored at the end of the reaction by titration.

Comparative Examples VIII to X are repeats of Comparative Example VII.

The results of Examples 7-9 and Comparative Examples VII to X are presented in Table 3.

TABLE 3

Experimental results of quenchers on the continuous process

| Example | Weight percent NCO at the end of reaction[1] |
|---|---|
| 7 | 0.01 |
| 8* | 0 |
| 9 | 0 |
| 10 | 0.01 |
| Comparative VII | 0.06 |
| Comparative VIII | 0.12 |
| Comparative IX | 0.07 |
| Comparative X | 0.07 |

*Example 8 was a repeat of Example 7.
[1]Weight percent NCO based on the total weight of the moisture-curable silylated polyurethane polymer and scavenging agents.

The experiment results showed with the quencher(s), the moisture-curable silylated polyurethane polymer produced at the end of the process can reach NCO reached to zero (as measured by titration or FTIR).

Examples 11-12 and Comparative Examples XI and XII

The Effect of Stabilizing Agents on Continuous Process and Moisture-Curable Silylated Polyurethane Polymer

Example 11

Moisture-curable silylated polyurethane was prepared in accordance with Example 2, except that the stabilization package was a pre-blended mixture of dibutyltin dilaurate catalyst (DBTDL, 20 ppm Sn) and 0.5 weight percent of phosphite stabilizer triisodecyl phosphite (Doverphos 6 obtained from Dover Chemical), where the weight percents are based on the weight of the polyol, and was injected into mixer (70) and mixed continuously together with the polyol at a point before the chain extension unit (20) of FIG. 7. The color was measured of freshly made material and after ageing the material at 80° C. for 4 days. BYK Gardner LCS IV was used for the measurement.

Example 12

Moisture-curable silylated polyurethane was prepared in accordance with Example 2, except that the stabilization package was a pre-blended mixture of dibutyltin dilaurate catalyst (DBTDL, 20 ppm Sn), and 0.5 weight percent phosphite stabilizer triisodecyl phosphite (Doverphos 6 obtained from Dover Chemicals) and 0.5 weight percent hindered phenolic stabilizer, Irganox 1135, where the weight percents are based on the weight of the polyol, and was injected into mixer (70) and mixed continuously together with polyol at a point before the chain extension unit ((20) of FIG. 7. The color was measured of freshly made material and after ageing the material at 80° C. for 4 day. BYK Gardner LCS IV was used for the measurement.

Comparative Example XI

Moisture-curable silylated polyurethane was prepared in accordance with Example 2, except that the stabilization package was a pre-blended mixture of dibutyltin dilaurate catalyst (DBTDL, 20 ppm Sn), and 1 weight percent of hindered phenolic stabilizer, Irganox 1135, where the weight percents are based on the weight of the polyol, and was injected into mixer (70) of the continuous unit together with polyol a point before the chain extension unit (20) of FIG. 7. The color was measured of freshly made material and after ageing the material at 80° C. for 4 day. BYK Gardner LCS IV was used for the measurement. Comparative Example XII is a repeat of Comparative Example XI. The data are presented in Table 4.

TABLE 4

Experimental results of color effect of stabilizer packages on the continuous process

| Example | Irganox 1135, phr | Doverphos 6, phr | Color immediately after reaction, Pt—Co | Color after ageing for 4 days at 80° C., Pt—Co |
|---|---|---|---|---|
| 11 | 0 | 0.5 | 21 | 21 |
| 12 | 0.5 | 0.5 | 29 | 26 |
| Comparative XI | 1 | 0 | 40 | 96 |
| Comparative XII | 1 | 0 | 38 | 86 |

The initial color and color after aging for 4 days at 80° C. was improved over the comparative examples which did not contain the Doverphos 6 stabilizer.

The invention claimed is:

1. A silylated polyurethane having the general formula (10)

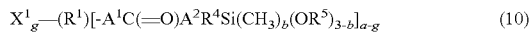

wherein
each occurrence of $X^1$ is a functional group selected from the group consisting of

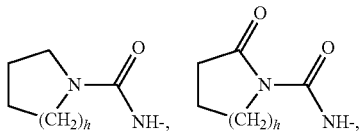

wherein each occurrence of $R^{15}$ is a monovalent hydrocarbon radical containing from about 1 to about 30 carbon atoms and optionally may contain a heteroatom, each occurrence of $R^{16}$ is hydrogen, an alkyl group of from 1 to 6 carbon atoms or phenyl, each occurrence of $R^{17}$ is hydrogen, an alkyl group of from 1 to about 6 carbon atoms or phenyl and the subscript his an integer of from 1 to about 6;

each occurrence of $A^1$ is a functional group selected from the group consisting of —O—, —S— and —NH—;

each occurrence of $A^2$ is a functional group selected from the group consisting of —S—, —$NR^6$—, where $R^6$ is selected from the group consisting of hydrogen, an alkyl group containing 1 to about 10 carbon atoms, cycloalkyl group containing from about 5 to about 10 carbon atoms, an aralkyl group containing from about 7 to about 10 carbon atoms, phenyl and —CH[(C=O)$OR^7$]$CHR^8$C(=O)$OR^7$, where $R^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and $R^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

$R^1$ is an organic group containing from about 50 to about 4,000 carbon atoms and at least one functional group selected from group consisting of —O—, —S—, —OC(=O)NH—, —$R^2$NC(=O)NH—, —C(=O)O—, —OC(=O)O—, —OCHR$^2$O—, —C(=O)$NR^2$— and —$NR^2$—, wherein each occurrence of $R^2$ is independently hydrogen, an alkyl group containing from 1 to about 6 carbon atoms or phenyl;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9$(O$R^{10}$)c$R^{11}$, wherein $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —C(=O)$R^{12}$, where $R^{12}$ is hydrogen, or an alkyl group of from 1 to about 6 carbon atoms, and the subscripts a, b, c and h are integers wherein a is 1 to about 5, b is 0 to about 2, c is 0 to about 5 and g is 1, with the provisos that (i) a-g is greater than or equal to 1, and (ii) when $A^1$ is —O— or —S—, then $A^2$ is —NH—.

2. The silylated polyurethane of claim 1 having a color of less than 50 Pt—Co.

3. The silylated polyurethane of claim 1 having less than about 0.02 weight percent isocyanate.

4. The silylated polyurethane of claim 1, wherein $R^1$ is an organic group derived from Formulae (2):

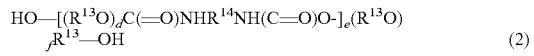

wherein each occurrence of $R^{13}$ is independently selected from the group consisting of an alkylene group of from about 2 to about 10 carbon atoms, a cycloalkylene group of from about 5 to about 10 carbon atoms, arylene group of from about 6 to about 10 carbon atoms and aralkylene group of from about 7 to about 12 carbon atoms, each occurrence of $R^{14}$ is independently selected from the group consisting of an alkylene group of from 1 to about 10 carbon atoms, a cycloalkylene group of from about 5 to about 12 carbon atoms, arylene group of from about 6 to about 10 carbon atoms, aralkylene group of from 7 to 12 carbon atoms, and the subscripts d, e and f are integers and each occurrence of d is from 1 to about 500, e is from 0 to about 5, and f is from 1 to about 500, with the proviso that (d)(e)+f is greater than or equal to about 25.

5. The silylated polyurethane of claim 4, wherein each $R^{13}$ is independently ethylene or propylene and each $R^{14}$ is independently hexylene, methylphenylene or

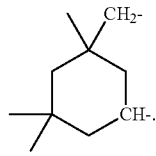

6. The silylated polymer of claim 1, wherein $R^1$ is an organic group derived from Formulae (3):

$$O=C=N-R^{14}NHC(=O)O-[(R^{13}O)_eC(=O)NHR^{14}NH(C=O)O-]_d(R^{13}O)_eC(=O)NHR^{14}-N=C=O \quad (3)$$

wherein each occurrence of $R^{13}$ is independently selected from the group consisting of an alkylene group of from about 2 to about 10 carbon atoms, a cycloalkylene group of from about 5 to about 10 carbon atoms, arylene group of from about 6 to about 10 carbon atoms and aralkylene group of from about 7 to about 12 carbon atoms, each occurrence of $R^{14}$ is independently selected from the group consisting of an alkylene group of from 1 to about 10 carbon atoms, a cycloalkylene group of from about 5 to about 12 carbon atoms, arylene group of from about 6 to about 10 carbon atoms, aralkylene group of from 7 to 12 carbon atoms, and the subscripts c, d and e are integers and each occurrence of c is from about 100 to about 500, d is 1, 2 or 3, and e is from about 100 to about 500.

7. The silylated polyurethane of claim 6, wherein each $R^{13}$ is independently ethylene or propylene and each $R^{14}$ is independently hexylene, methylphenylene or

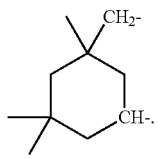

8. The silylated polyurethane of claim 1, wherein $R^1$ is an organic group derived from Formulae (4):

$$O=C=N-R^{14}NHC(=O)O-[(R^{13}O)_dC(=O)NHR^{14}NH(C=O)O-]_e(R^{13}O)_fR^{13}-OH \quad (4)$$

wherein each occurrence of $R^{13}$ is independently selected from the group consisting of an alkylene group of from about 2 to about 10 carbon atoms, a cycloalkylene group of from about 5 to about 10 carbon atoms, arylene group of from about 6 to about 10 carbon atoms and aralkylene group of from about 7 to about 12 carbon atoms, each occurrence of $R^{14}$ is independently selected from the group consisting of an alkylene group of from 1 to about 10 carbon atoms, a cycloalkylene group of from about 5 to about 12 carbon atoms, arylene group of from about 6 to about 10 carbon atoms, aralkylene group of from 7 to 12 carbon atoms, and the subscripts d, e and f are integers and each occurrence of d is from 1 to about 500, e is from 0 to about 5, and f is from 1 to about 500, with the proviso that (d)(e)+f is greater than or equal to about 25.

9. The silylated polyurethane of claim 8, wherein each $R^{13}$ is independently ethylene or propylene and each $R^{14}$ is independently hexylene, methylphenylene or

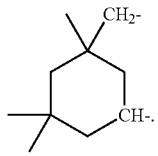

10. A process for the preparation of the silylated polymer comprising (a) continuously reacting a prepolymer with a silylating agent, by a silylation reaction, to produce a silylated polymer composition;
(b) continuously backmixing at least a first portion of the silylated polymer composition with a loop connected from a downstream outlet to an upstream outlet of a reactor to adjust to at least one upstream process parameter; and
(c) continuously reacting at least a second portion of the silylated polymer composition with a cyclic amide scavenging agent or scavenging package containing at least one cyclic amide scavenging agent to produce the quenched silylated polymer of claim 1.

11. The process of claim 10, wherein the cyclic amide scavenging agent is selected from the group consisting of ε-caprolactam and 2-pyrrolidone.

12. The process of claim 10, wherein the silylating agent of step (a) has the general Formula (5):

$$YR^4Si(CH_3)_b(OR^6)_{3-b} \quad (5)$$

wherein

Y is a functional group selected from the group consisting of $N=C=O$, —SH, —OH and —$NHR^6$, where $R^6$ is selected from the group consisting of hydrogen, an alkyl group containing 1 to about 10 carbon atoms, cycloalkyl group containing from about 5 to about 10 carbon atoms, an aralkyl group containing from about 7 to about 10 carbon atoms, phenyl and $CH[(C=O)OR^7]CHR^8C(=O)OR^7$, where $R^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and $R^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9(oR^{10})_cOR^{11}$, where $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —$C(=O)R^{12}$, where $R^{12}$ is hydrogen, or an alkyl group of from 1 to about 6 carbon atoms; and the subscripts b and c are integers where b is 0 to about 2 and c is 0 to about 5.

13. The process of claim 10, wherein the prepolymer is at least one prepolymer selected from the group consisting of a chain extended polyol with terminal hydroxyl groups, chain extended polyol with terminal isocyanate groups or a chain extended polyol with both hydroxyl and isocyanate groups.

14. The process of claim 10 further comprising adding a stabilization package to at least one of steps (a), (b) or (c).

15. The process of claim 10 wherein the stabilization package comprises at least one of a hindered phenol or phosphite stabilizer.

16. A silylated polymer composition comprising
(i) at least one silylated polymer of claim 1; and
(ii) a stabilization package.

17. The silylated polymer composition of claim 16, wherein the stabilization package comprises at least one of a hindered phenol or phosphite stabilizer.

18. A system for the continuous production of a silylated polyurethane according to claim 1 comprising
- a silylation unit having a tubular reactor with an upstream inlet and a downstream outlet; and
- a backmixing loop providing fluid communication from the downstream outlet to the upstream inlet.

19. The system of claim 18, wherein the backmixing loop comprises at least one of a pump, a heat exchanger, a jacketed static mixer, or a variable diameter endcapping unit.

20. The system of claim 18, further comprising at least one upstream process chamber comprising a chain extension unit in fluid communication with the inlet, at least one downstream process chamber unit comprising a quenching unit in fluid communication with the outlet, wherein the chain extension unit is connected with an endcapping unit either directly or through a line which connects the two units.

\* \* \* \* \*